(12) United States Patent
Leger et al.

(10) Patent No.: US 12,704,182 B2
(45) Date of Patent: Aug. 11, 2026

(54) BUTTERFLY VALVE SEAL

(71) Applicant: Fisher Controls International LLC, Marshalltown, IA (US)

(72) Inventors: Bryan Leger, Marshalltown, IA (US); Wade Helfer, Marshalltown, IA (US)

(73) Assignee: Fisher Controls International LLC, Marshalltown, IA (US)

( * ) Notice: Subject to any disclaimer, the term of this patent is extended or adjusted under 35 U.S.C. 154(b) by 0 days.

(21) Appl. No.: 18/894,375

(22) Filed: Sep. 24, 2024

(65) Prior Publication Data

US 2026/0085756 A1 Mar. 26, 2026

(51) Int. Cl.
*F16K 1/226* (2006.01)

(52) U.S. Cl.
CPC .................................. *F16K 1/2266* (2013.01)

(58) Field of Classification Search
CPC ..................................................... F16K 1/2266
See application file for complete search history.

(56) References Cited

U.S. PATENT DOCUMENTS 3,734,457 A * 5/1973 Roos ..................... F16K 1/2285 251/173
4,623,121 A * 11/1986 Donnelly ............. F16K 1/2266 251/305
11,236,830 B2 2/2022 Leger
2007/0215834 A1* 9/2007 Helfer .................. F16K 1/2261 251/359
2008/0073612 A1* 3/2008 Day ....................... F16J 15/121 251/306
2011/0114863 A1* 5/2011 Nelson ................. F16K 1/2263 251/306
2014/0203201 A1* 7/2014 Kinser ................. F16K 1/2263 251/306
2023/0151888 A1* 5/2023 Miyashita ........... F16K 27/0218 251/306

* cited by examiner

*Primary Examiner* — Patrick C Williams
(74) *Attorney, Agent, or Firm* — Quarles & Brady LLP

(57) ABSTRACT

A valve assembly can include a valve body and a seal ring. The seal ring can be seated in a seal cavity of the valve body. The seal ring can include a base that extends in an axial direction within the seal cavity, a leg that extends from the base, and a foot that extends from the leg. When a disk of the valve assembly is in a closed valve position, a primary seal can be formed between the foot and the disk and a secondary seal is formed between the base and a first wall of the seal cavity. The seal ring can accommodate disk drift at least partly via elastic bending, and can provide disk tracking via lateral movement within the seal cavity.

17 Claims, 33 Drawing Sheets

100
106
112
120
114
104
102

100
106
112
120
114
104
102

106
168
232
170
142
182
120
230
184
114
112
140
102
100

232
232
120
140
100

100
120
170
114
140
142
230
112
106
140
168
102

100
170
240
114
120
140
142
112
168

BUTTERFLY VALVE SEAL

BACKGROUND

Valve assemblies can employ various seal systems therein. For example, in a butterfly valve, a seal system can be configured to assist a disk in inhibiting flow through the valve when the valve is placed in a closed position. In general, a seal assembly that increases seal integrity within the valve and that manages disk drift and disk tracking may be desired.

SUMMARY

Some examples of the present disclosure provide a valve assembly. The valve assembly can include a valve body, a valve passageway, a disk, a seal cavity, and a seal ring. The valve passageway extends in an axial direction through the valve body. The disk can be arranged to selectively inhibit flow through the valve passageway of the valve body, the disk movable between a valve open position and a valve closed position. The seal cavity can be formed, or at least partially formed, in the valve body. The seal ring can include a base that extends in the axial direction within the seal cavity, a leg that extends from the base, transversely to the axial direction, and a foot that extends from the leg. When the disk is in the valve closed position, a primary seal can be formed between the foot and the disk and a secondary seal can be formed between the base and a first wall of the seal cavity.

Some examples of the present disclosure provide a seal system for use in a seal ring cavity of a butterfly valve. The seal system can include a seal ring having a seal ring body. The seal ring body can include a base that extends in an axial direction within the seal ring cavity, a leg that extends from the base in a lateral direction toward a disk of the butterfly valve and, in a cross-sectional plane, is cantilevered relative to the base, and a foot that extends from the leg and is configured to engage the disk when the butterfly valve is in a closed position. The seal ring can be moveable in the lateral direction within the seal ring cavity to accommodate disk movement that is perpendicular to the axial direction.

Some examples of the present disclosure provide a method of sealing a butterfly valve. The method can include rotating a disk of a butterfly valve toward a closed position, and engaging, with the disk, a foot of a seal ring disposed within a seal cavity of the butterfly valve. The seal ring can include a base that extends in an axial direction within the seal cavity, a leg extending from the base and the foot extending from the leg. Upstream pressure can be applied to cause the disk to drift in a downstream direction, so that the foot can elastically deflect and form a primary seal between the foot and the disk. The base of the seal ring can undergo torsion and engage a first wall of the seal cavity to form a secondary seal between the base and the first wall of the seal cavity.

DETAILED DESCRIPTION

Figure 1:
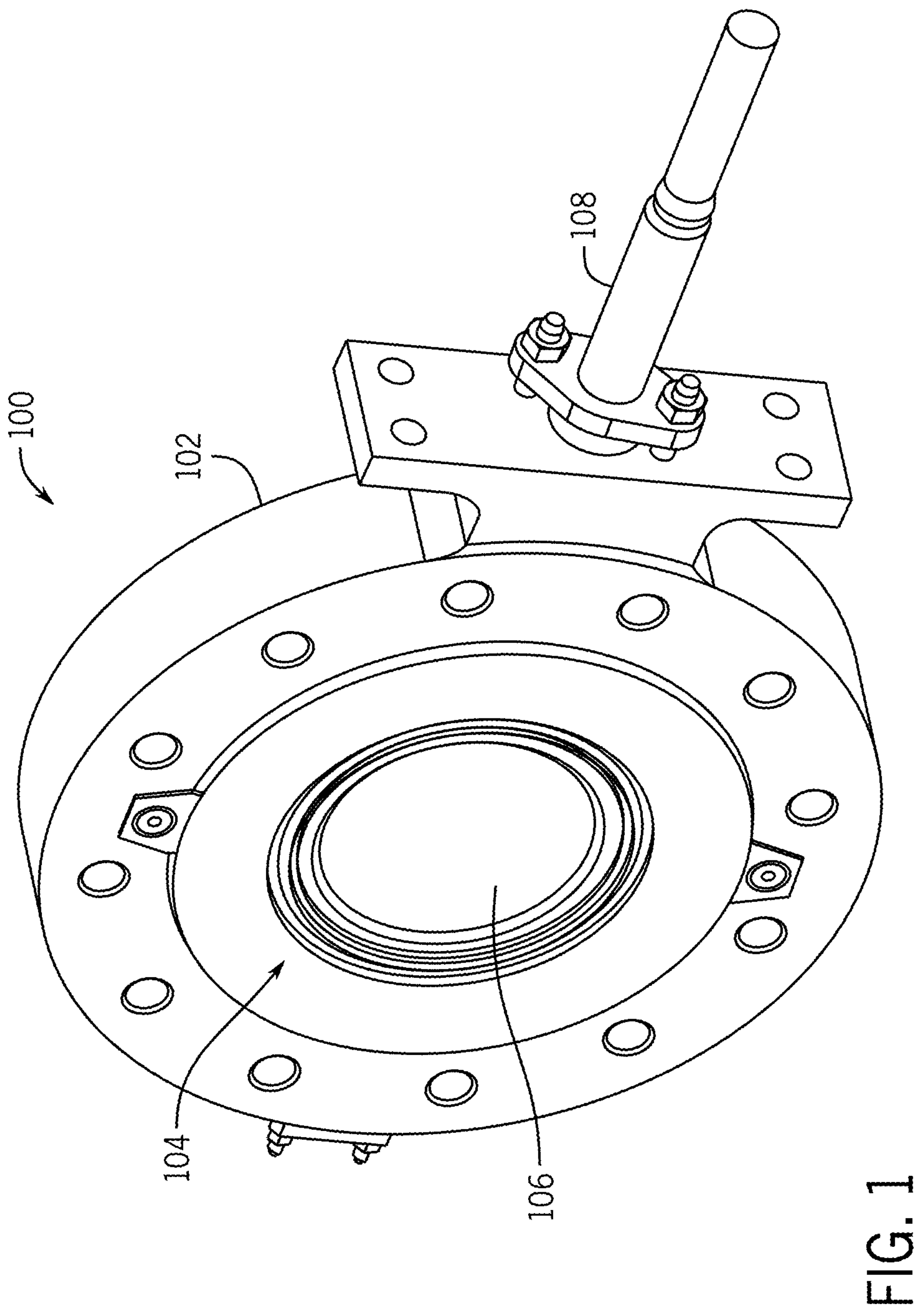
FIG. 1 is an axonometric view of a butterfly valve in a closed position.

The concepts disclosed in this discussion are described and illustrated with reference to exemplary arrangements. These concepts, however, are not limited in their application to the details of construction and the arrangement of components in the illustrative examples and are capable of being practiced or being carried out in various other ways. The terminology in this document is used for the purpose of description and should not be regarded as limiting. Words such as “including,” “comprising,” and “having” and variations thereof as used herein are meant to encompass the items listed thereafter, equivalents thereof, as well as additional items.

The seal ring systems and valve assemblies and methods disclosed herein may be embodied in many different forms. Accordingly, although several specific examples are discussed herein to exemplify principles of the disclosed technology, the disclosed technology is not intended to be limited to the examples illustrated.

As briefly described above, valves can use various seal members and seal systems therein to selectively prevent (or substantially reduce) flow through a valve. For example, control valves, such as butterfly valves, ball valves, or other types of rotary valves, include a seal, such as a seal ring. Such valves typically include a control element (e.g., a disk, ball, segmented ball, etc.), which can be rotated via a drive shaft to control fluid through a pipeline or other vessel under various temperatures and pressures. Such control valves can be installed in a pipeline to control a wide variety of fluids or flow media, including gas, liquid, slurry, etc. Various industries, including oil and gas production, transmission and refining, power generation, pulp and paper production, metals and mining, chemical, and food and beverage industries for example, can employ such control valves.

While under pressure, a control element of a control valve (e.g., a disk or ball) can drift or float downstream. That is, when the valve is in a closed position relative to flow media that is pressurized to flow from an upstream side of the valve to a downstream side of the valve, pressure from the flow media can urge the control element downstream, thus causing drift. Although generally constrained at a maximum by a stem or other structures that support the control element, disk float or drift can occur in various amounts depending on, for example, stiffness of the shaft or of the control element, valve size and other general configuration, fluid pressure, and clearances within the drive train. Disk (or, generally, control element) drift can be unavoidable, and, particularly when the drift is substantial, can cause seal strain or leakage with existing seal designs.

Some conventional valves can include seals that are designed to tolerate disk drift. However, it is often difficult for a seal to tolerate both low drift at low pressures and high drift at high pressures, especially when high and low pressure are present throughout the lifecycle of the valve. In particular, the return to low pressure from a high-pressure event can be the most difficult condition for conventional seals to withstand while maintaining seal integrity and consistent shutoff performance.

Some conventional valve seals can be made with one or more polymers, including polytetrafluoroethylene (PTFE) and ethene-co-tetrafluoroethene (ETFE), for example, which can be generally resilient to wear and pressure drop swings. Such polymer seals are often referred to as a ‘soft’ seal. The conforming nature of the polymer allows pressure drop memory (e.g., fluctuating high and low pressures) while typically maintaining shutoff and leakage requirements. Such polymer seals can be useful in low leakage and low torque conditions as long as the process conditions are favorable. However, polymer seals can wear, degrade, or even fail depending on the type of flow media and operating temperatures.

For higher temperature conditions that may not be suitable for polymer seals, valve seal rings can be made out of metal. However, with conventional approaches, metal seal rings may generally wear relatively quickly, and thus may require coatings or hardening processes and more frequent replacement. Further, because metal does not exhibit the same degree of conformability as polymers, conventional metal seals may not as effectively maintain shutoff performance as pressure fluctuates.

In general, it would be desirable to have a seal that can withstand cycling (e.g., cycling between high and low pressure loading, or cycling rotation of a control element between open and closed positions), temperatures, and other operating conditions that metal seals can, while performing like a soft (e.g., polymer) seal to provide the same precise and restrictive leakage as provided by a typical soft seal. Some conventional metal seal designs have attempted to match a soft seal’s leakage. However, the loads required to conform a metal seal to the control element are much greater than that of a soft seal. The higher load required to meet soft seal shutoff translates into higher breakout torque (i.e., the torque required to unseat a closed valve). Contrastingly, when a breakout torque value is maintained between a conventional soft seal and a conventional metal seal, the leakage of the metal seal is much higher than the soft seal, and thus may not achieve certain leakage requirements.

Conventional metal seals typically fall into categories based on their mechanism of deformation. Overall, elastic deformation is desired to handle varying pressures in a single system. One type of conventional metal seal is a dilator-type seal. These seals typically rely on diametrical dilation (e.g., from hoop stress) to elastically dilate and return within its limits. Additionally, these seals typically distort in the radial direction (e.g., diametrical dilation) as a response to disk drift. Another type of conventional metal seal is a bending-type or flexural-type seal. These seals typically rely on a leg of the seal to bend and flex along with disk drift. These seals are typically clamped in place and can be pressure assisted. For both categories, it is generally desirable to have the seal remain in the elastic deformation zone regardless of the amount of disk drift found in a given valve assembly.

Such conventional seals can have a variety of limitations. For example, dilator-type seals can be subject to high seat loads and can yield diametrically or crush in the pipeline direction at high pressures. Flexural-type seals can also yield at high pressure or have a stiffness that causes high and unwanted breakout torque. In addition, these conventional seals are typically clamped in place, which can lead to centerline misalignment between the seal and the disk, and leakage over the life of the valve. Thus, it may generally be challenging to obtain consistent performance for these conventional designs.

As described above, conventional valve seals can perform poorly under high disk drift and may accordingly be subject to seat yielding when exposed to high pressures. When these seals are exposed to high pressure, yielding can occur in the radial or downstream directions. When yielding occurs, and the pressure in the system is lowered, the seal performance can degrade due to plastic deformation of the seal. That is, the seal does not return to its original leakage performance (e.g., at low pressures) after being exposed to high pressures.

Particularly with respect to butterfly valves, it can be difficult to provide a valve seal that effectively manages disk drift. As noted above, disk drift is movement downstream that the disk experiences when closed and loaded (i.e., under pressure). This drift is the result of trim clearance and elastic shaft bending under the load. In one non-limiting example, a downstream disk drift for a six-inch valve may be tens of thousandths of an inch (e.g., 0.040 inches for a 6-inch valve), which can result in both downstream and radial interference values much higher than intended for conventional seal designs. For example, metal-on-metal sealing may rely on disk-to-seal interference of just a few thousandths of an inch, regardless of disk drift state. Accordingly, the disk drift distance may be between, for example, eight and forty times the interference designed into a seal. Conventional metal seals cannot handle such disk drift and can correspondingly yield under high pressure conditions. Or, if the seals are designed to resist yielding, they are then generally too stiff and require very high operating torque, which may be above trim limits. Similar efforts to utilize a higher yield strength material within conventional designs can also produce high torque scenarios if yielding does not occur. Accordingly, conventional approaches may be limited to a relatively narrow set of pressure conditions, with yielding at higher pressures-and corresponding degradation in sealing performance-being largely unavoidable.

Aspects of the present disclosure can address these and other drawbacks of conventional sealing systems for control valves. For example, seal rings according to the present disclosure can provide an advantageous combination of material and geometry that can effectively accommodate high disk drift with minimal plastic deformation, restrict leakage in compliance with required standards, and provide disk tracking management to prevent or reduce centerline misalignment, among other advantages described below.

Generally, seal rings as disclosed herein can provide seal elasticity by using an elastically deformable leg. In some embodiments, the seal elasticity can be provided by a combination of bending of a cantilevered leg (as viewed from a cross section) and cross-sectional torsion, to elastically withstand disk drift while maintaining adequate sealing contact with relevant components. With optimized geometry parameters (e.g., leg thickness, outer diameter, post/base thickness, post/base height, etc.) and material properties (e.g., yield strength), the seals can behave elastically when exposed to pressure and disk drift. Thus, embodiments of seals disclosed herein can withstand a wide range of pressure swings (e.g., compared to conventional seals) while maintaining seal loads upon return to a low-pressure state.

Additionally, seal rings disclosed herein can provide improved disk tracking management. For example, seals disclosed herein can track the disk of the butterfly valve in a direction parallel to a radial direction or lateral direction, allowing the seal to find and engage the disk wherever the disk resides. Unlike many conventional seals, seals according to some embodiments of the present disclosure, because not clamped in the seal cavity against movement (e.g., radial or torsional movement), may be free to move within the seal cavity (e.g., translate radially) to accommodate disc locations at various pressures. Furthermore, not clamping the seal ring against movement in the seal cavity of the valve may result in the elastic behavior of the seal ring becoming much more predictable. In some embodiments, as further detailed below, the seal ring may engage a downstream wall of the seal cavity during operation but not an upstream wall, leaving a nominal gap between the upstream wall of the seal cavity and the seal. The nominal gap can allow the seal to torsionally rotate under load (e.g., to provide a tertiary seal at the upstream wall), as well as to translate within the seal cavity to find the disk.

According to elements of the disclosure, the geometry of seal rings disclosed herein can be tuned to behave elastically to a prescribed pressure state. As a result, lower-cost and lower-yield materials can be used in environments for which typically a higher-cost and higher-yield material would be used. The overall geometries disclosed herein provide customizable and repeatable leakage requirements.

Furthermore, embodiments of the present disclosure can provide advantageous torque assistance. For example, in use, with pressure acting on a shaft side of a valve disk, seal rings according to embodiments of the disclosure can contact and form a seal with the disk to form a primary seal. The seal rings can also contact a side wall of the seal ring cavity (e.g., at a retainer that forms the seal ring cavity) to form a secondary seal. In this regard, there is a difference in diameters between the primary and secondary seals. Because of the difference in sealing diameters, a pressure delta (i.e., difference) occurs across a portion of the seal ring (e.g., a leg of the seal ring). Such a pressure difference can result in a net force acting on the leg in the same direction as the disk drift as well as pressure assists the secondary seal. The behavior of the seal ring under pressure (e.g., a bending of the leg of the seal ring) can correspondingly reduce the net load between the seal ring and the disk, allowing a lower breakout torque (e.g., compared to that of conventional seals, such as dilator-type seals), as well as helping to form a particularly strong secondary seal. This low torque behavior in particular, for example, can allow for a higher ceiling of pressure capability compared to a seal ring which only relies on radial dilation to resist disk drift.

In general, the manufacturability of seal rings according to embodiments of the present disclosure also provides advantages over conventional seal rings. For example, the geometry of the seal rings disclosed herein can be machined (e.g., turned on a lathe) readily with standard inserts and tool holders. In contrast, some conventional seal rings incorporate complex cross sections with multiple angles and thin cross-sectional geometries that can be subject to breakage and specialty tooling. Relatedly, the cross-sectional geometries of seal rings disclosed herein also advantageously handle disk drift and pressure resistance by bending and providing torsional stiffness (e.g., as generally discussed above). Overall, the nominal geometry of the seals disclosed herein can be much thicker than conventional seals (e.g., dilator-type seals). Because of the relatively stiff cross section, the geometry lends itself to increased stability in manufacturing and processing where a low form error and smooth surface finish is desired.

Figure 2:
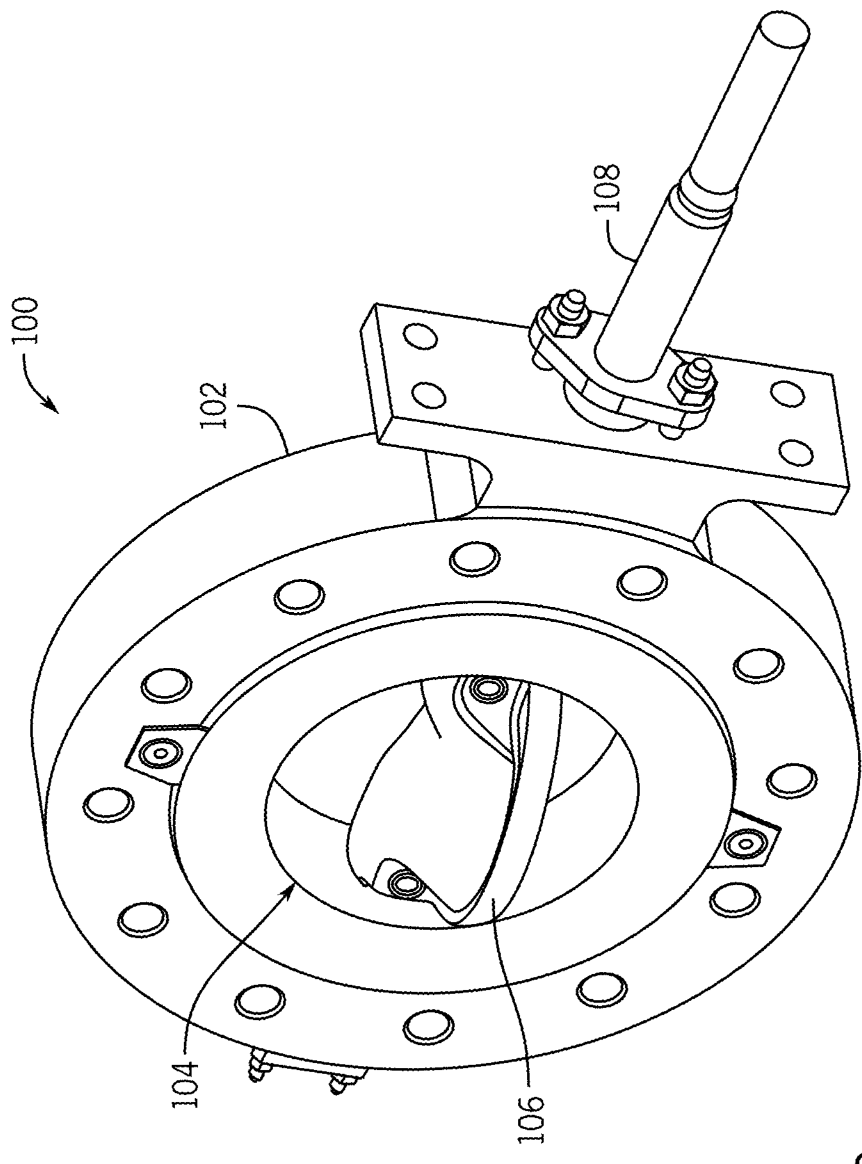
FIG. 2 is an axonometric view of the butterfly valve in an open position.

With reference now to the figures, FIGS. 1 and 2 illustrate an exemplary butterfly valve 100. The butterfly valve 100 includes a valve body 102 and a valve passageway 104 that extends in an axial direction through the valve body 102. The butterfly valve 100 also includes a disk 106 that can be actuated via a drive shaft 108. FIG. 1 specifically shows the butterfly valve 100 in a valve closed position where the disk 106 blocks the valve passageway 104 to prevent a fluid from flowing therethrough. FIG. 2 shows the butterfly valve 100 in a valve open position where the disk 106 would allow fluid through the valve passageway 104.

Figures 3, 4:
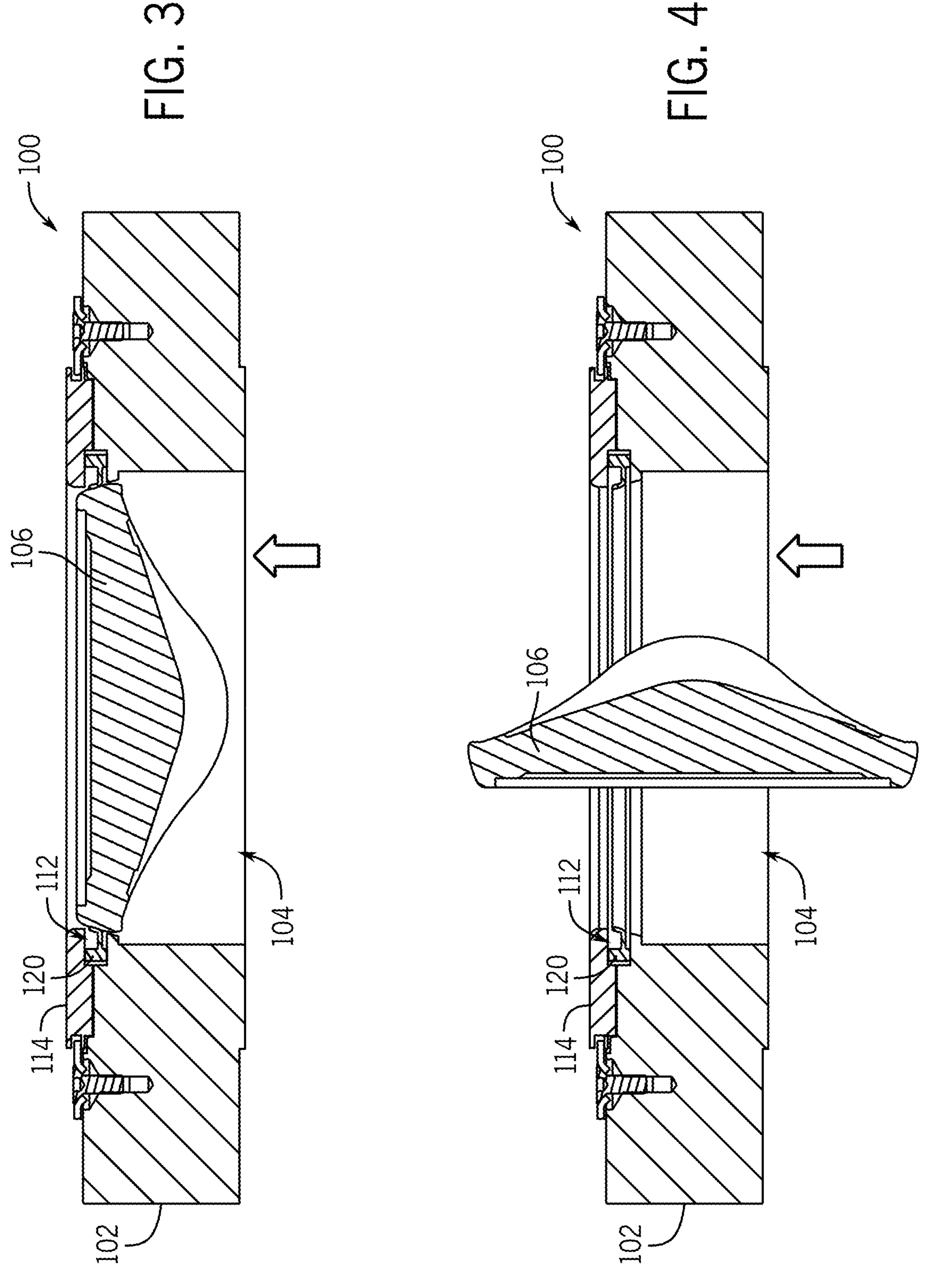
FIG. 3 is a cross-sectional view of the butterfly valve in the closed position.
FIG. 4 is a cross-sectional view of the butterfly valve in the open position.

FIGS. 3 and 4 show cross sections of the valve 100 in the valve closed and valve open positions, respectively. In the cross-sectional views of FIGS. 3 and 4, a seal ring cavity 112 is shown. Boundaries of the seal ring cavity 112 are at least partially formed by the valve body 102 and by a seal retainer 114. Further shown in FIGS. 3 and 4, an exemplary seal ring 120 is seated in the seal ring cavity 112. The seal ring 120 shown in FIGS. 3 and 4 is by way of example, and as will be described below, other seal rings, including seal rings with varying geometries may be used in the butterfly valve 100 or other valve assembly.

Figure 5:
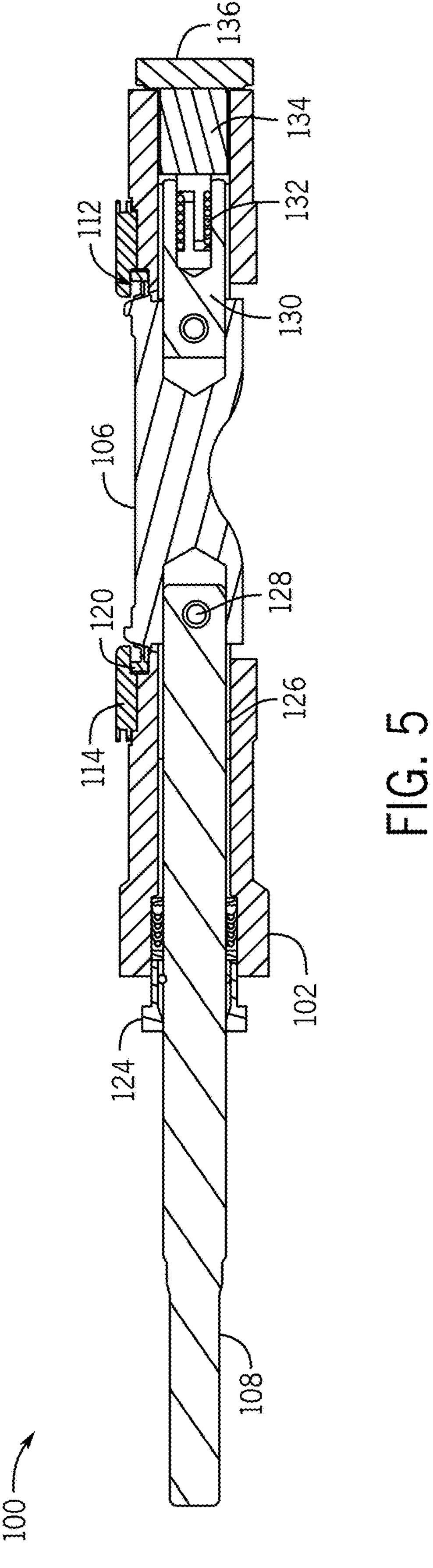
FIG. 5 is a cross-sectional view of the butterfly valve along a drive shaft of the butterfly valve.
Figure 6:
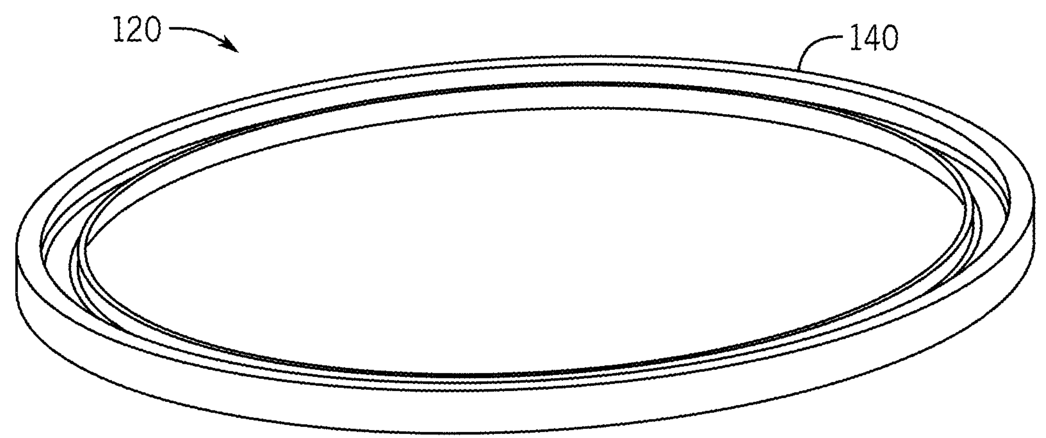
FIG. 6 is an axonometric view of a seal ring for a butterfly valve according to an example of the disclosed technology.

FIG. 5 illustrates another cross-sectional view of the valve 100. In the cross-sectional view of FIG. 5, other components of the valve 100 are shown. This includes a packing follower 124, bearings 126, expansion pins 128, a follower shaft 130, a follower spring 132, a spacer, and an end cap 136. FIG. 6 shows the seal ring 120 that is visible in FIGS. 3 and 4. The seal ring 120 includes a seal ring body 140. Features and advantages of the seal ring 120 are discussed below with reference to FIGS. 7-11, which each show a cross section of the seal ring 120.

Figure 7:
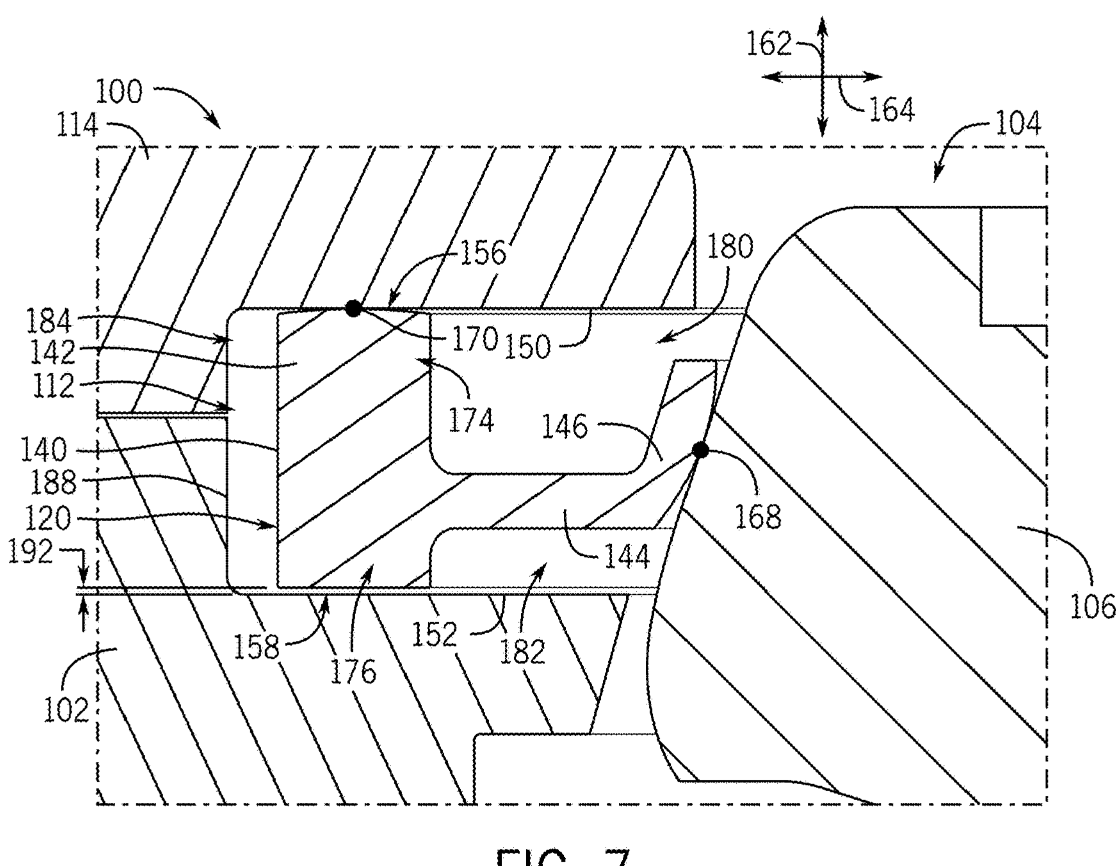
FIG. 7 is a cross-sectional partial view of the seal ring of FIG. 6 seated in a seal cavity of the butterfly valve.

As shown in FIG. 7, the body 140 of the seal ring 120 includes a base (e.g., a post) 142, a leg 144, and a foot 146. The base 142 extends in an axial direction within the seal ring cavity 112 between a first wall 150 and a second wall 152 of the seal ring cavity 112. In the example shown, the first wall 150 of the seal ring cavity 112 is formed by the seal retainer 114 and the second wall 152 of the seal ring cavity 112 is formed by the valve body 102. Furthermore, in the illustrated embodiment, the first wall 150 of the seal ring cavity 112 is oriented at a downstream side 156 of the seal ring 120 and the second wall 152 of the seal ring cavity 112 is oriented at an upstream side 158 of the seal ring 120. Upstream and downstream refer to the expected flow direction of fluid through the passageway 104 of the valve 100. The flow direction also aligns with an axial direction 162 of the valve 100. However, in other embodiments, the flow direction might be different.

With continued reference to FIG. 7, the leg 144 extends from the base 142 in a lateral direction 164 toward the valve disk 106. In the illustrated view, the lateral direction refers to a particular radial direction, where generally the radial direction is perpendicular to the axial direction 162 and the lateral direction is also perpendicular to the axial direction 162 in the cross-sectional orientation shown. In the illustrated embodiment, in the cross-section, the leg 144 is cantilevered relative to the base 142. Furthermore, the leg 144 extends from the base 142 at a location along the height of the base 142 (i.e., in the axial direction 162) that is closer to the upstream side 158 of the seal ring 120. That is, the leg 144 is disposed closer to the second wall 152 of the seal ring cavity 112, particularly when there is little or no force acting on the disk 106 that would cause disk drift in the downstream direction. The seal ring body 140 further includes the foot 146. The foot 146 extends from the leg 144 and is configured to sealingly engage the disk 106 when the disk 106 is in a valve closed position.

In FIG. 7, the disk 106 is shown in a valve closed position where there is little or no disk drift. That is, the disk 106 is moved little or no distance in the downstream direction from an upstream fluid pressure acting on the disk 106. When the disk 106 is in the valve closed position as shown (or in a valve closed position and experiencing disk drift), the seal ring 120 forms a primary seal with the disk 106 and a secondary seal with the seal ring cavity 112. More specifically, in the illustrated embodiment, the foot 146 of the seal ring 120 forms the primary seal 168 with the disk 106 and the downstream side 156 of the base 142 of the seal ring 120 forms the secondary seal 170 with the seal retainer 114 at the first wall 150 of the seal ring cavity 112 (where the primary and secondary seals 168, 170 are areas of sealing between the respective components).

Figure 18:
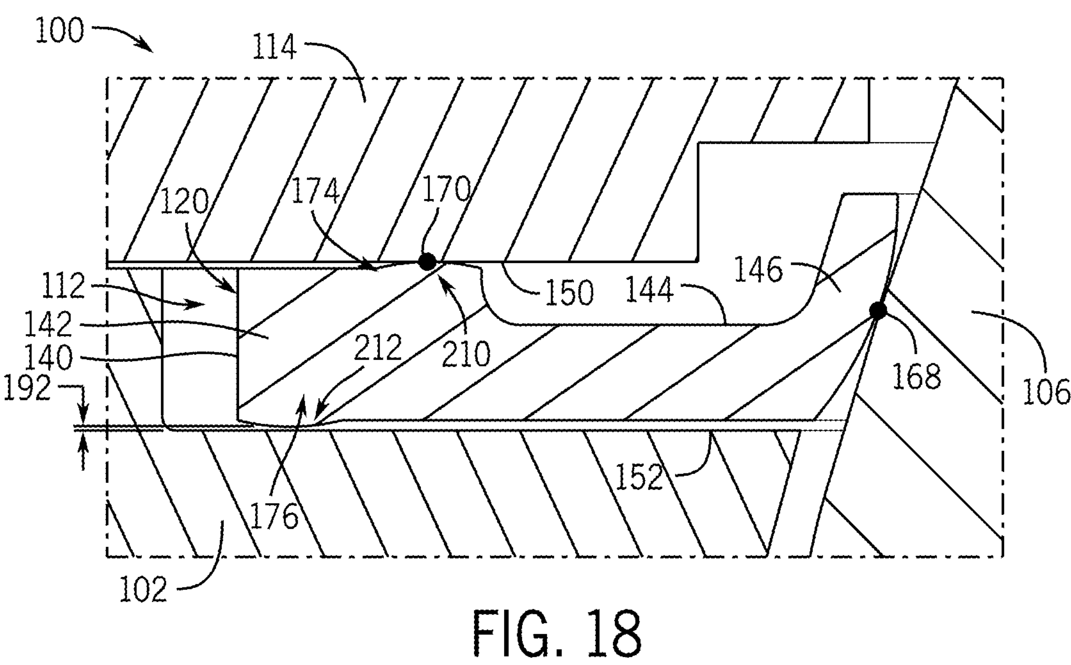
FIG. 18 is a cross-sectional partial view of another embodiment of a seal ring including first and second contact structures, the seal ring seated in a seal cavity of a butterfly valve, according to an example of the disclosed technology.
Figure 19:
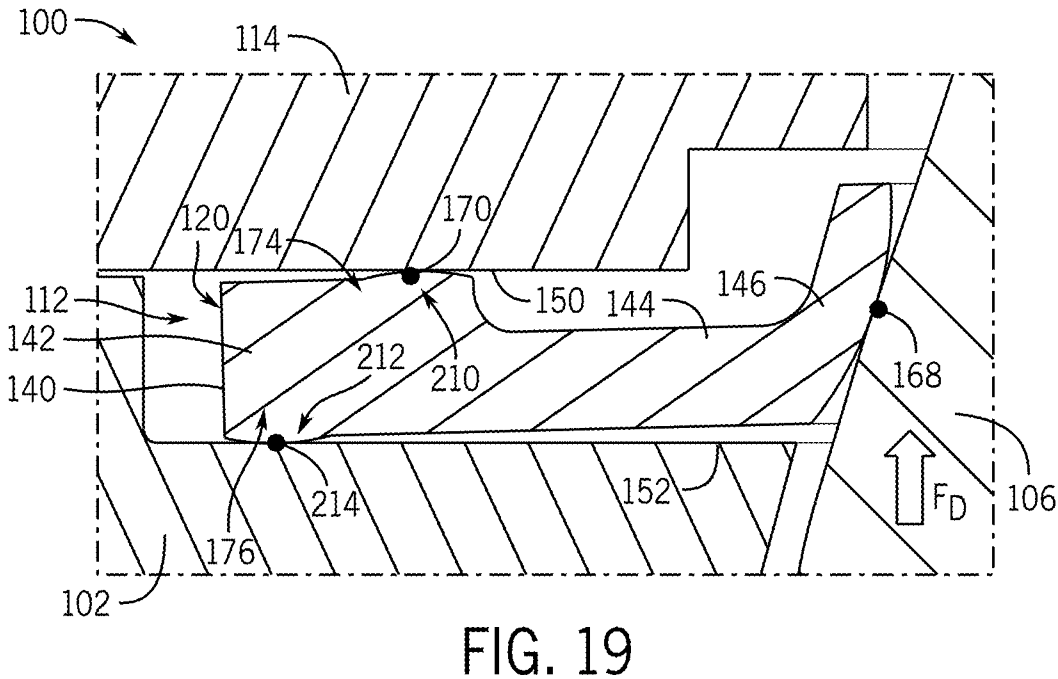
FIG. 19 is a cross-sectional partial view of the seal ring of FIG. 18 and a disk of the butterfly valve under pressure.
Figure 20:
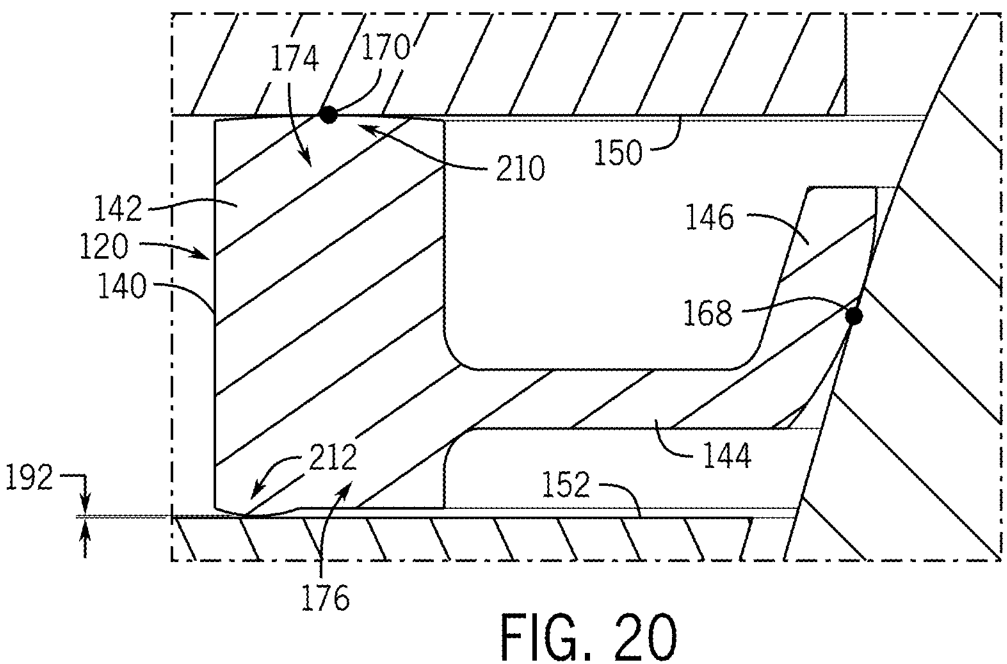
FIG. 20 is a cross-sectional partial view of another embodiment of a seal ring including first and second contact structures, the seal ring seated in a seal cavity of a butterfly valve, according to an example of the disclosed technology.

In general, each of the members of the seal ring body 140 can define a height and a thickness. For example, the base 142 can define a base height in the axial direction 162 that extends between the first and second walls 150, 152 of the seal ring cavity. The base 142 can also define a base thickness in the lateral direction 164. In the illustrated embodiment shown in FIG. 7, the base height is greater than the base thickness. However, in other embodiments, such as embodiments that have a shorter seal ring cavity 112 (i.e., in the axial direction 162), the base thickness may be greater than the base height (see, for example, FIGS. 18 and 19).

Figure 16:
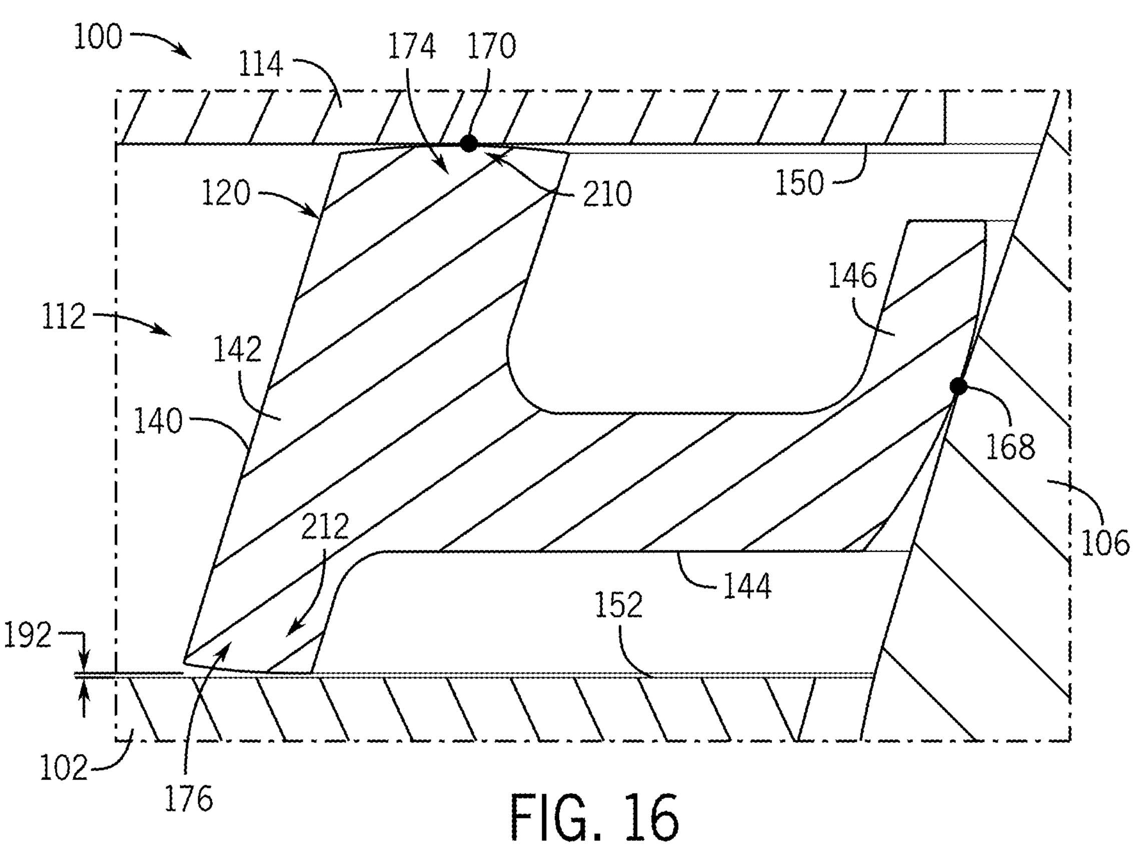
FIG. 16 is a cross-sectional partial view of another embodiment of a seal ring including first and second contact structures, the seal ring seated in a seal cavity of a butterfly valve, according to an example of the disclosed technology.
Figure 17:
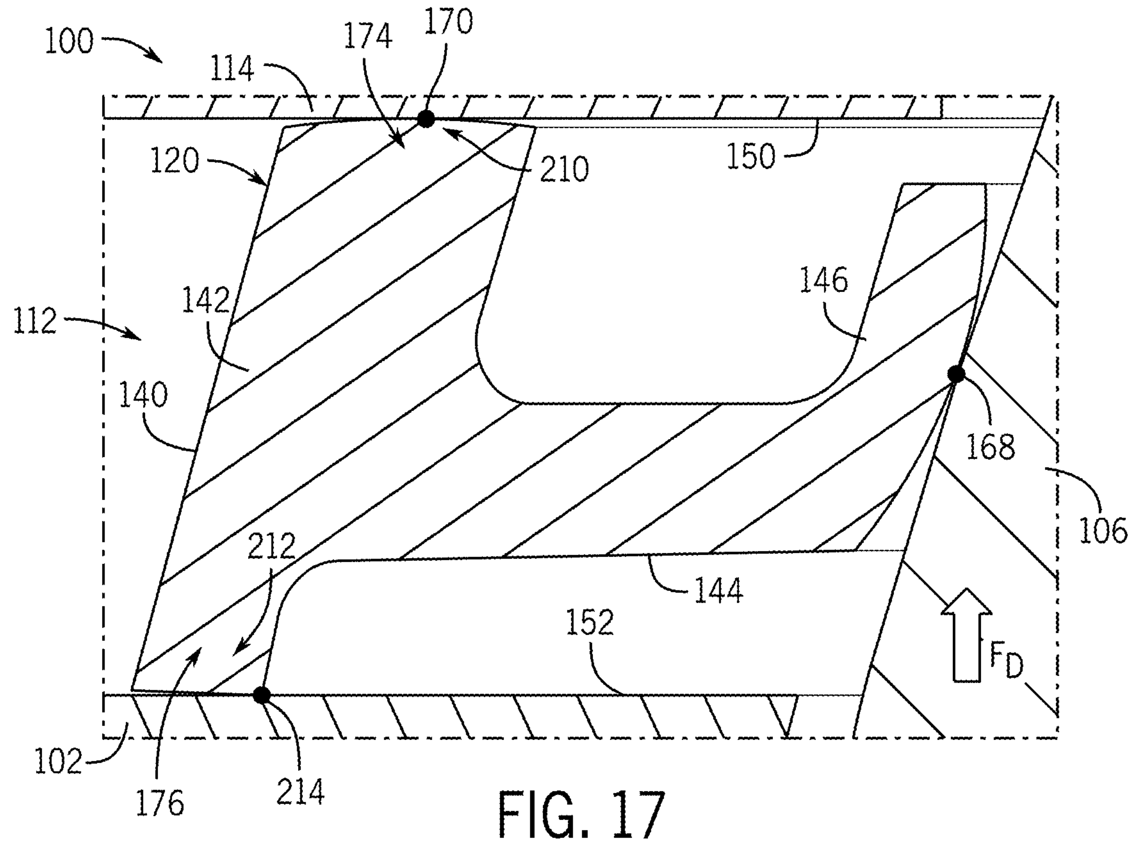
FIG. 17 is a cross-sectional partial view of the seal ring of FIG. 16 and a disk of the butterfly valve under pressure.

The base 142 can also define a downstream portion 174 and an upstream portion 176 that is generally segmented by where the leg 144 extends from the base. In the illustrated embodiment, both the downstream and upstream portions 174, 176 of the base 142 have the same or similar base thicknesses but different heights (which corresponds to the leg 144 being disposed closer to the second wall 152 of the seal ring cavity 112). However, in other embodiments, the downstream and upstream portions 174, 176 of the base 142 can have different thicknesses (see, for example, FIGS. 16 and 17).

Still referring to FIG. 7, the seal ring body 140 is dimensioned so that the foot 146 extends at least partially outside of the seal ring cavity 112 and into the valve passageway 104 to engage the disk 106 when the disk 106 is in the valve closed position. The leg 144 generally separates the seal ring cavity 112 into a downstream volume 180 and an upstream volume 182. Furthermore, the base 142 generally forms an outward lateral volume 184 between the base 142 and a third wall 188 of the seal ring cavity 112. As shown, the third wall 188 can extend between and generally perpendicular to the first and second walls 150, 152 of the seal ring cavity 112 and can be formed by both the valve body 102 and the seal retainer 114. Also shown in FIG. 7, there is a gap 192 in the axial direction between the base 142 and the second wall 152 of the seal ring cavity 112. As will be described in further detail with reference to FIG. 8, the gap 192 can provide certain pressure equalization and other advantages related to valve performance and assembly, including improved ability of the seal ring body 140 to track movement of the disk 106.

Figure 8:
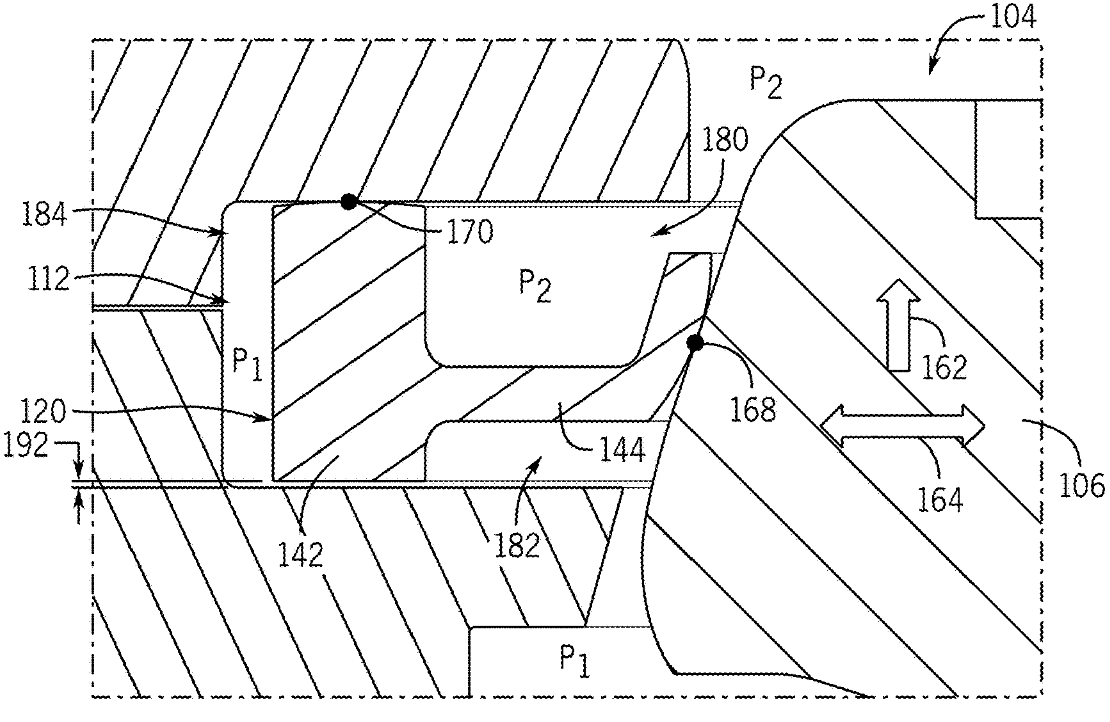
FIG. 8 is a cross-sectional partial view of the seal ring of FIG. 7 including exemplary arrows that indicate directions of valve disk drift and tracking.

Turning now to FIG. 8, the cross-sectional view of FIG. 7 is again shown. As highlighted in FIG. 8, the gap 192 can allow pressure equalization between the upstream volume 182 of the seal ring cavity 112 and the outward lateral volume 184 of the seal ring cavity 112. As shown, when the disk 106 is in a valve closed position (or a valve open position), the upstream pressure of the valve passageway 104 can be at the same or similar pressure as each of the upstream volume 182 and the outward lateral volume 184, as indicated by $P_1$ in FIG. 8. When the disk 106 is in the valve closed position and a fluid pressure is acting on the upstream side of the disk 106, the primary seal 168 and the secondary seal 170 prevent fluid flow from the upstream side of the disk 106 to the downstream side of the disk 106, thus creating a pressure differential within the valve passageway 104 and between the upstream volume 182 and the downstream volume 180 of the seal ring cavity 112, as indicated by $P_1$ and $P_2$ in FIG. 8.

With continued reference to FIG. 8, another advantage to the valve system is that the seal ring 120 is allowed to move in the lateral direction 164 to accommodate disk tracking, including with reduced resistance as compared to conventional arrangements, due to the presence of the gap 192. In general, disk tracking is the lateral movement of the disk 106, as indicated by the lateral arrow 164 on the disk in FIG. 8. During assembly or use, the disk 106 may move laterally and as a result, may lose or have weakened contact with a conventional seal ring. Advantageously, the seal ring 120 is also allowed to move in the lateral direction 164 to find (e.g., remain in sealing contact with) the disk 106 as the disk 106 is moved off center. In the illustrated embodiment, the gap 192 can facilitate the lateral movement of the seal ring 120, in particular, because the seal ring 120 is correspondingly not immovably clamped within the seal ring cavity 112, like conventional valve seals may be.

Figure 9:
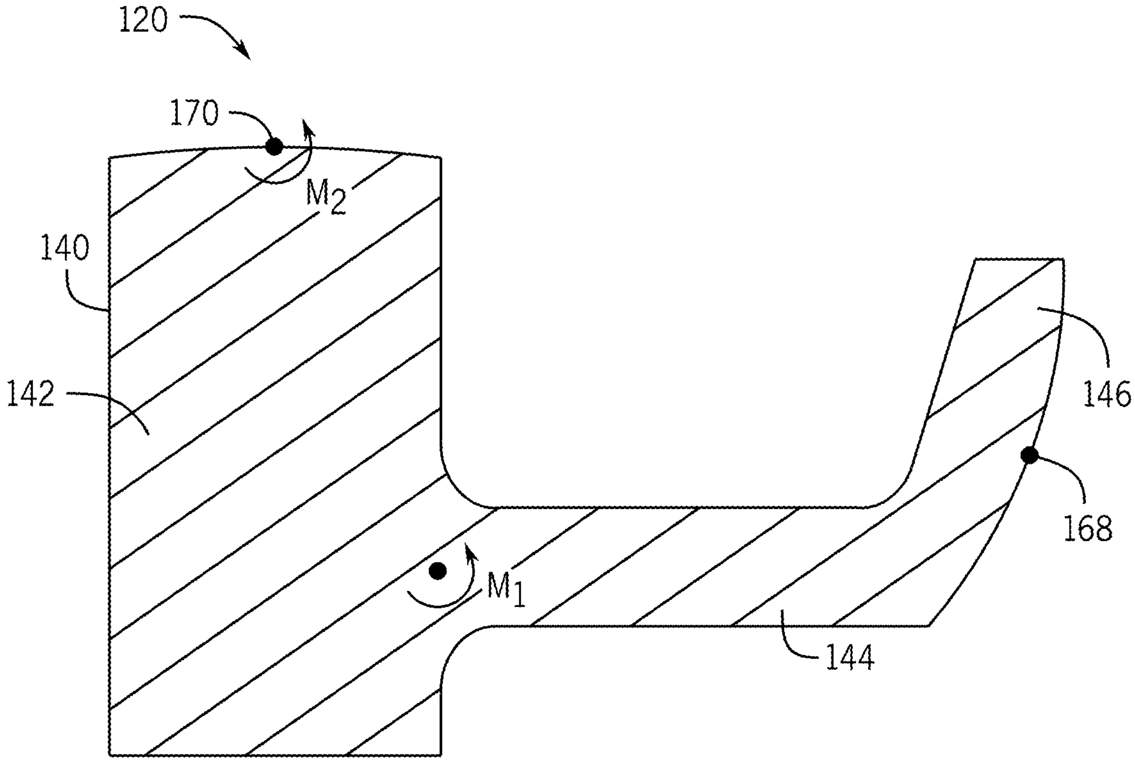
FIG. 9 is a cross-sectional partial view of the seal ring of FIG. 7 including exemplary arrows that indicate points of rotation of the seal ring.

Furthermore, disk drift, which may be in the axial direction 162 as indicated by arrow in FIG. 8, is accommodated by the seal ring 120 via an elastic bending of the leg 144 and cross-sectional torsion of the base 142. FIG. 9 shows a schematic representation of the seal ring 120. In particular, FIG. 9 shows first and second bending moments of the seal ring 120 about rotation points $M_1$ and $M_2$. In use, when the seal ring 120 is actively providing a seal between the upstream and downstream sides of the valve passageway 104 via the primary seal 168 and the secondary seal 170, multiple forces are applied to the seal ring body 140. The force applied to the foot 146 at the primary seal 168 and the force applied to the base 142 at the secondary seal 170 form the bending moment for the leg 144 at the first rotation point $M_1$ and the torsional moment for the base 142 at the second rotation point $M_2$. In this regard, for example, the second rotation point $M_2$ can correspond to a point of sealing contact for the base 142 (e.g., for a secondary seal with a retainer ring, as further discussed above and below).

It should be appreciated that the bending and torsion points of FIG. 9 are by way of example and that bending and torsion can occur at various locations of the seal ring body 140 depending on specific seal ring geometry, valve configuration, or process conditions. However, it remains that the overall advantageous elastic deformation of the seal ring body 140 is a product of deliberate geometry and material composition that can be optimized by a variety of parameters including operating conditions (e.g., temperature, pressure, fluid type, etc.) and valve specifications (e.g., size, rated flow rate, material composition, etc.).

Figure 10:
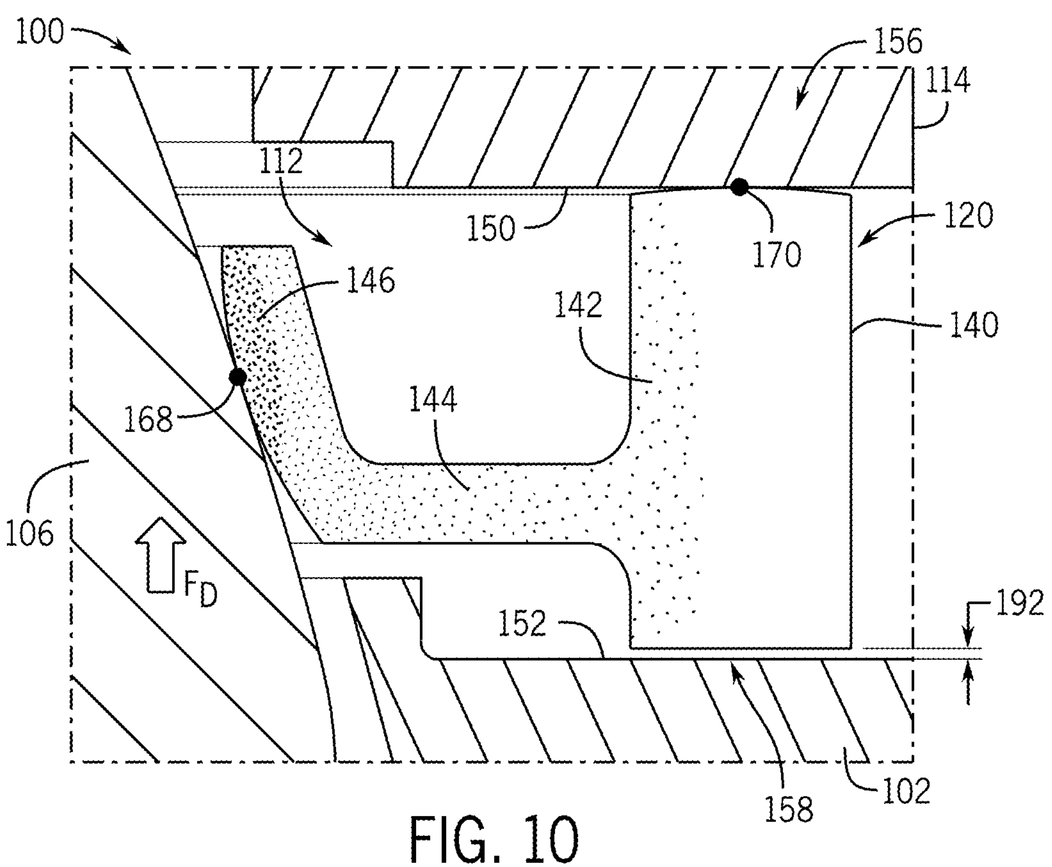
FIG. 10 is an exemplary finite element analysis of the seal ring of FIG. 7 and the disk of the butterfly valve in a closed position and under relatively low pressure.
Figure 11:
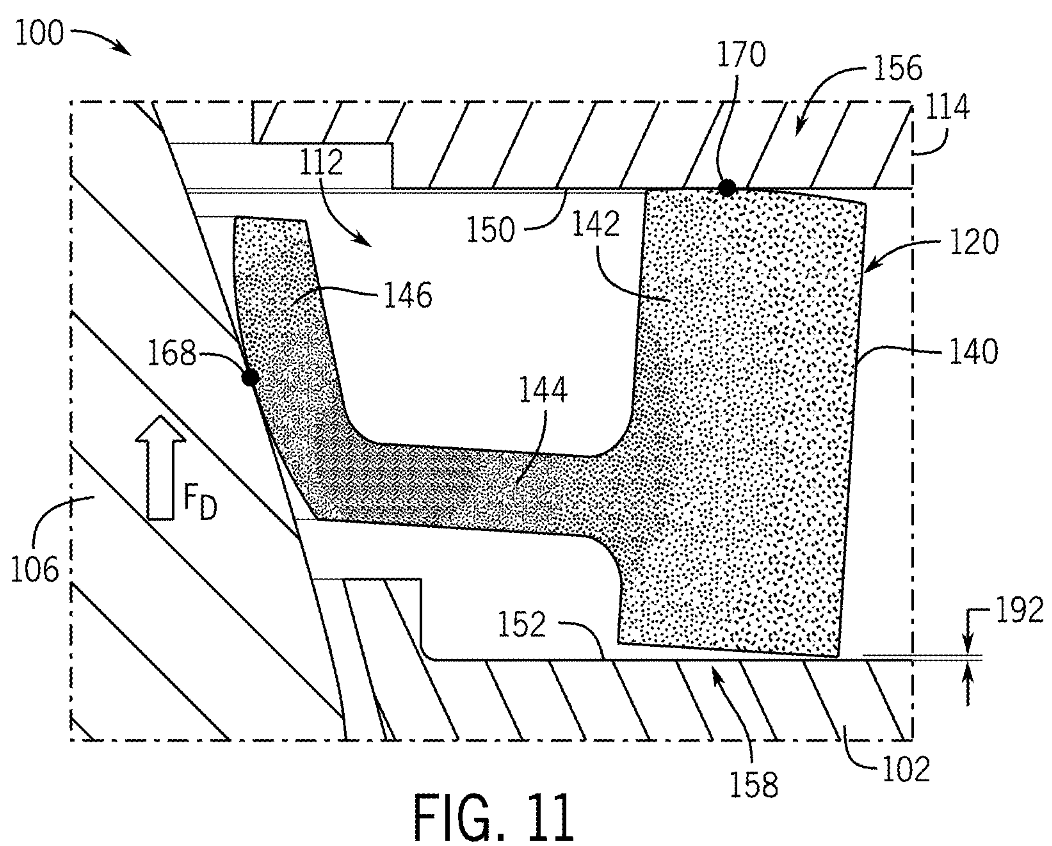
FIG. 11 is an exemplary finite element analysis of the seal ring of FIG. 7 and the disk of the butterfly valve in a closed position and under relatively high pressure.

FIGS. 10 and 11 show exemplary finite element analyses conducted on the seal ring 120 under low and high pressure, respectively, acting on the disk 106. As shown in FIG. 10, there is minimal stress acting on the seal ring body 140, and the gap 192 may be maintained so that the seal ring body 140 can easily move laterally to follow the disk 106 and a pressure balancing via the gap 192 may be possible (e.g., as described relative to FIG. 8). In contrast, FIG. 11 shows stress concentrating near the foot 146 and leg 144 as the disk 106 bends the leg 144 and tilts the base 142 to produce a greater force at the secondary seal 170. As shown, bending that occurs in the foot 146 or leg 144 of the seal ring 120 is generally elastic and the geometry will accordingly return to the original shape once the pressure is decreased on the disk 106. Also as further shown in FIGS. 10 and 11, the size of the gap 192 between the base 142 and the second wall 152 of the seal ring cavity 112 at the upstream side 158 may be reduced as the high pressure loading, due to torsion on the body 140, although the gap 192 may remain under some high pressure conditions (e.g., as shown).

In general, FIGS. 1-5 illustrate a valve assembly of the butterfly valve 100 and FIGS. 6-11 illustrate example configurations of the seal ring 120 that may be used in the valve assembly of the butterfly valve 100. As noted above, the seal ring 120 configurations of these figures are presented by way of example, and other geometries of seal rings are possible, as will be described below. Relatedly, the particular butterfly valve 100 shown in FIGS. 1-5 is by way of example, and the seal ring 120 may be used with other variations of valve assemblies. Furthermore, some of the following figures show portions of a valve that will be referred to as the butterfly valve 100 and its corresponding components. However, it should be appreciated that valves illustrated in FIGS. 7-58 may be other valve assemblies and are only referred to as the butterfly valve 100 by way of example.

Likewise, other geometries of seal rings that are described with reference to FIGS. 12-58 below and use like-reference numbers for the seal ring 120, where applicable. Accordingly, unless otherwise indicated, discussion of similarly numbered components above also applies below, and vice versa. Correspondingly, while the example seal rings 120 described herein are presented using the same reference numbers, it should be appreciated that other geometric variations can provide various embodiments of seal rings with varying characteristics, while still applying the same or similar physical properties or functionality as other seal rings discussed herein. Features of seal rings 120 described below that are not part of or discussed with respect to the seal ring 120 of FIGS. 6-11 will be discussed separately and be given a corresponding reference number, as applicable. It should also be appreciated that the features, geometries, and components associated with any of the exemplary seal rings 120 described throughout the disclosure can be incorporated, combined, or replaced with any of the other features, geometries, and components of the other seal rings 120 described and shown with this disclosure (e.g., to substitute particular body, arm, foot, or contact surface geometry from one of the rings 120 into another of the rings 120).

FIGS. 12-23 illustrate additional embodiments of seal rings 120. For example, the seal rings 120 of FIGS. 12-23 include a first contact structure 210 at the secondary seal 170 and a second contact structure 212 at a tertiary contact point 214. As described above, the secondary seal 170 is formed between base 142 of the seal ring 120 and the first (downstream) wall 150 of the seal ring cavity 112 (e.g., the seal retainer 114) at the downstream portion 174 of the base 142. Relatedly, the tertiary contact point 214 can form a tertiary seal between the base 142 of the seal ring 120 and the second (upstream) wall 152 of the seal ring cavity 112 (e.g., the valve body 102) at the upstream portion 176 of the base 142.

Furthermore, each of the first and second contact structures 210, 212 shown in FIGS. 12-23 are offset in the lateral direction. In particular, the first contact structure 210 is closer to the disk 106 than the second contact structure 212 and the second contact structure 212 is closer to the third wall 188 of the seal ring cavity 112 than the first contact structure 210.

Figure 12:
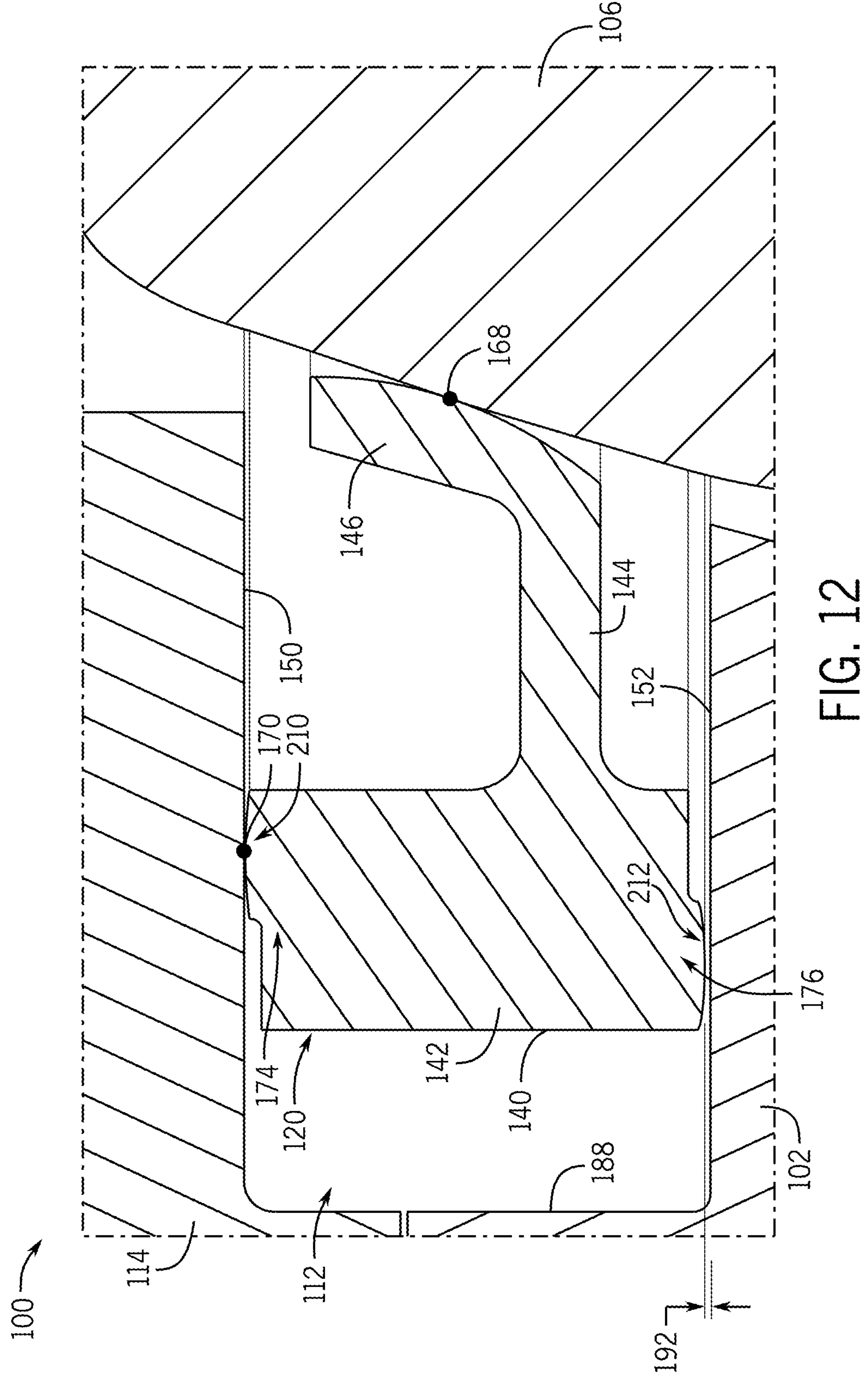
FIG. 12 is a cross-sectional partial view of an embodiment of a seal ring including first and second contact structures, the seal ring seated in a seal cavity of a butterfly valve, according to an example of the disclosed technology.

With reference now to FIG. 12, an exemplary embodiment of the seal ring 120 in the seal ring cavity 112 of the valve 100 is shown. As generally described above, the seal ring 120 of FIG. 12 includes the first contact structure 210 and the second contact structure 212. In the illustrated orientation, a gap 192 is formed between the second contact structure 212 and the second wall 152 of the seal ring cavity 112. The gap 192 exists when the disk 106 is in a valve open position and when the disk 106 is in a valve closed position with relatively little (e.g., no) fluid force acting on the valve disk 106 (e.g., FIG. 12). In contrast, the gap 192 may be closed (e.g., eliminated) when there is sufficient force acting on the disk 106 (e.g., via outward and downstream torsional rotation of the seal ring 120, as shown in FIG. 13).

Figure 13:
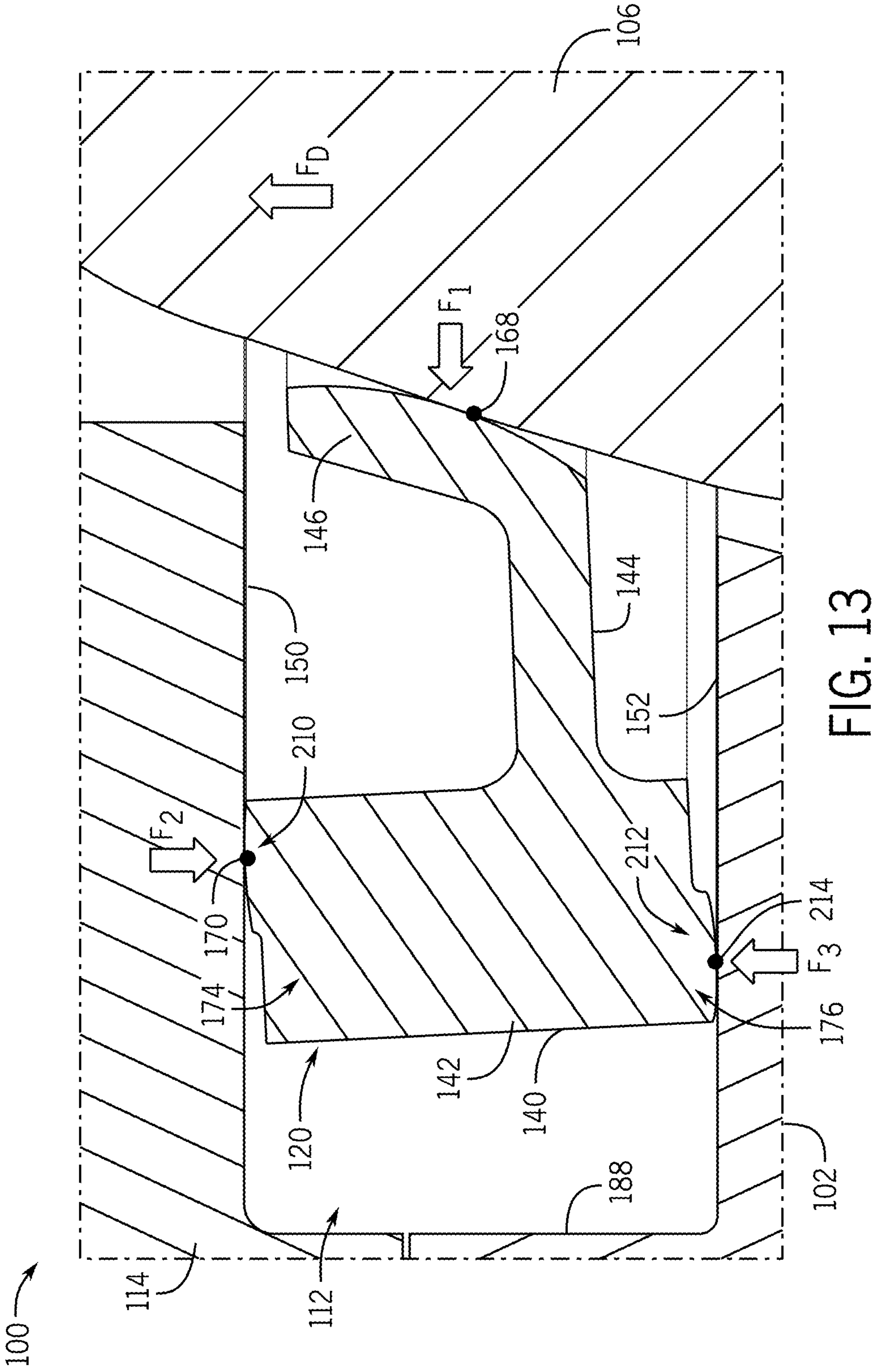
FIG. 13 is a cross-sectional partial view of the seal ring of FIG. 12 and a disk of the butterfly valve under pressure.
Figure 14:
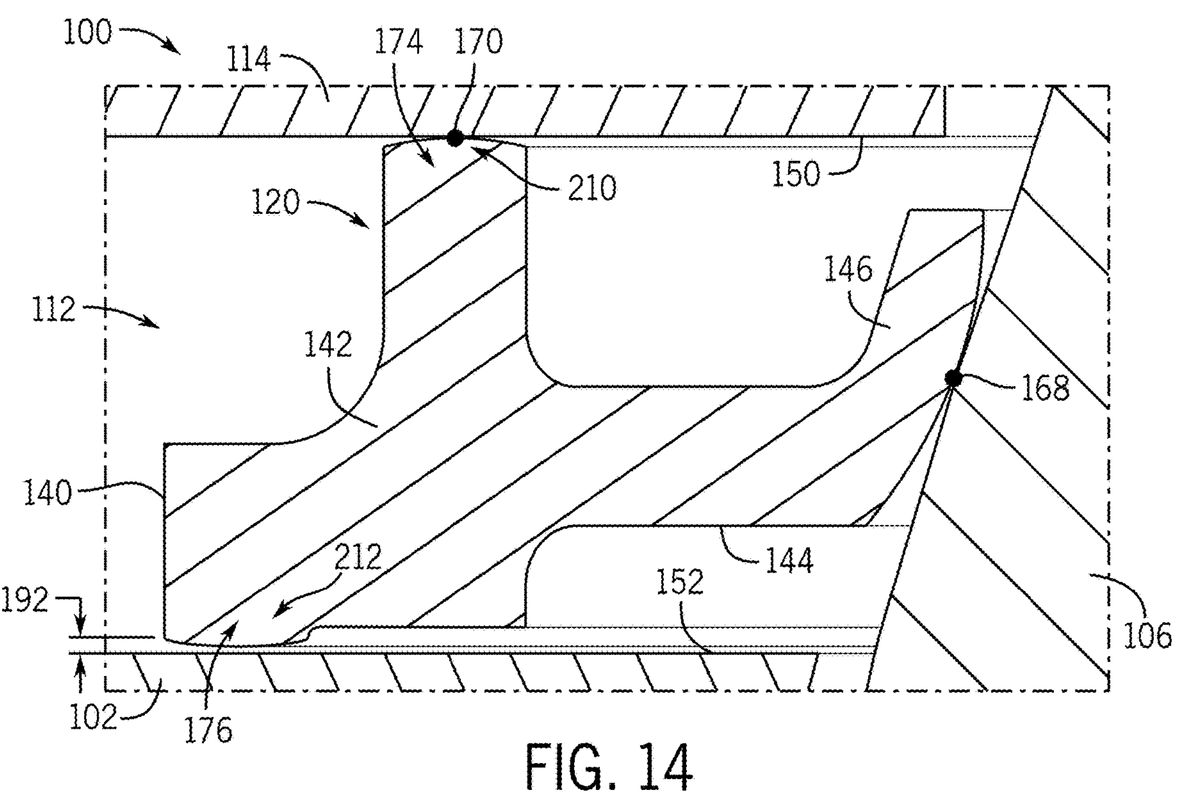
FIG. 14 is a cross-sectional partial view of another embodiment of a seal ring including first and second contact structures, the seal ring seated in a seal cavity of a butterfly valve, according to an example of the disclosed technology.

With reference to FIG. 13, when there is a larger force FD acting on the disk 106 (as compared to FIG. 12), a corresponding first force $F_1$ may be applied to the foot 146 of the seal ring 120 to form the primary seal 168, causing a second force $F_2$ to be applied to the first contact structure 210 to form the secondary seal 170. Further, with sufficient magnitude of the force FD, the seal ring body 140 may be rotated (e.g., downstream and outwardly, as shown) so that a third force $F_3$ may be applied to the second contact structure 212 at the tertiary contact point 214 (e.g., with a corresponding tertiary seal). In particular, in the example illustrated, the secondary seal 170 has a larger contact diameter than the primary seal 168, which allows a moment to be generated in the seal ring 120 by contact between the disk 106 and the foot 146, along with a corresponding torsional rotation of the base 142 and the establishment (or strengthening) of the tertiary seal (e.g., at the contact point 214, as shown). In general, $F_2$ and $F_3$ are thus increased with disk drift, with corresponding improvement in the sealing performance of the secondary and tertiary seals as disk drift increase. Further, upon removal (or lessening) of the disk drift, the seal 168 overall can still elastically return to an appropriate sealing configuration for lower pressures (e.g., as shown in FIG. 12).

Put differently, in use, fluid pressure acting on the disk 106 can cause disk drift in the direction of $F_D$. As the disk 106 drifts, the engagement of the disk 106 with the cantilevered leg 144 deflects the leg 144 and thus causes rotation of the cross section of the seal ring 120 (e.g., via torsion applied via the leg 144). Thus, a mechanical lever action can increase the secondary seal 170 load and the tertiary seal load at point 214 when the gap 192 is closed by the seal ring's 120 elastic rotation. Further, the contact at the secondary seal 170 and the tertiary contact point 214, via the first and second contact structures 210, 212, can provide anti-rotation features for the seal ring 120 to resist excess rotation.

Referring back to FIG. 12, when the seal ring 120 is first installed in the valve assembly, the gap 192 exists and allows the seal ring 120 and the disk 106 to track (e.g., translate) in the lateral direction. Like the tracking capabilities described above, the seal ring 120 of FIG. 12 advantageously is thus allowed to move laterally within the seal ring cavity 112 to find the disk. In contrast, some conventional seal rings are clamped or otherwise secured within a seal ring cavity without being able to move in the lateral direction. This can cause unwanted disk misalignment as the disk moves in the lateral direction. As further discussed above, however, rotation of the seal ring 120 by loading of the disk 106 can result in the gap 192 closing (e.g., via response to torsion on the seal ring 120) so that a tertiary seal can be formed at an upstream side of the seal ring cavity (i.e., replacing the gap 192) in some operating conditions.

With reference to FIGS. 12 and 13, the first and second contact structures 210 include generally rounded (e.g., radiused) surfaces where they contact the respective walls 150, 152 of the seal ring cavity 112. The rounded surfaces advantageously prevent binding or wedging of the seal ring 120 within the seal ring cavity 112. In particular, the rounded surfaces become three-dimensional toroidal sections and allow for the seal ring 120 to rotate (e.g., rock) about the contact point of the contact structures 210, 212 which prevents binding. Thus, for example, a rounded surface can allow a seal to rotate relative to a second moment (see, e.g., rotation point $M_2$ in FIG. 9) while the seal is in a clamped state, thus reducing strain on a leg of the seal. Further, inclusion of a rounded surface allows more precise control over where contact may occur between the seal ring and the corresponding cavity wall (e.g., to control an amount of offset between contact points on the opposed cavity walls 150, 152). This can in turn allow more control with regard to how much rotation can occur relative to a second moment (e.g., rotation point $M_2$ in FIG. 9), prior to the seal contacting an upstream wall (e.g., wall 152, as shown in FIG. 13).

In general, the inclusion of a variety of combinations of selectively rounded surfaces, legs of selectable lengths and thickness, or selective lateral placement of the base and contact points can allow a metal seal to be tuned to a particular application so as to minimize the probability of permanent deformation as disk drift increases. However, other contact structures and geometries are possible. For example, if the gap 192 is reliably present, then the contact structures 210, 212 can generally not be rounded (e.g., radiused) and may accordingly include relatively sharper or rectangular features.

Figure 15:
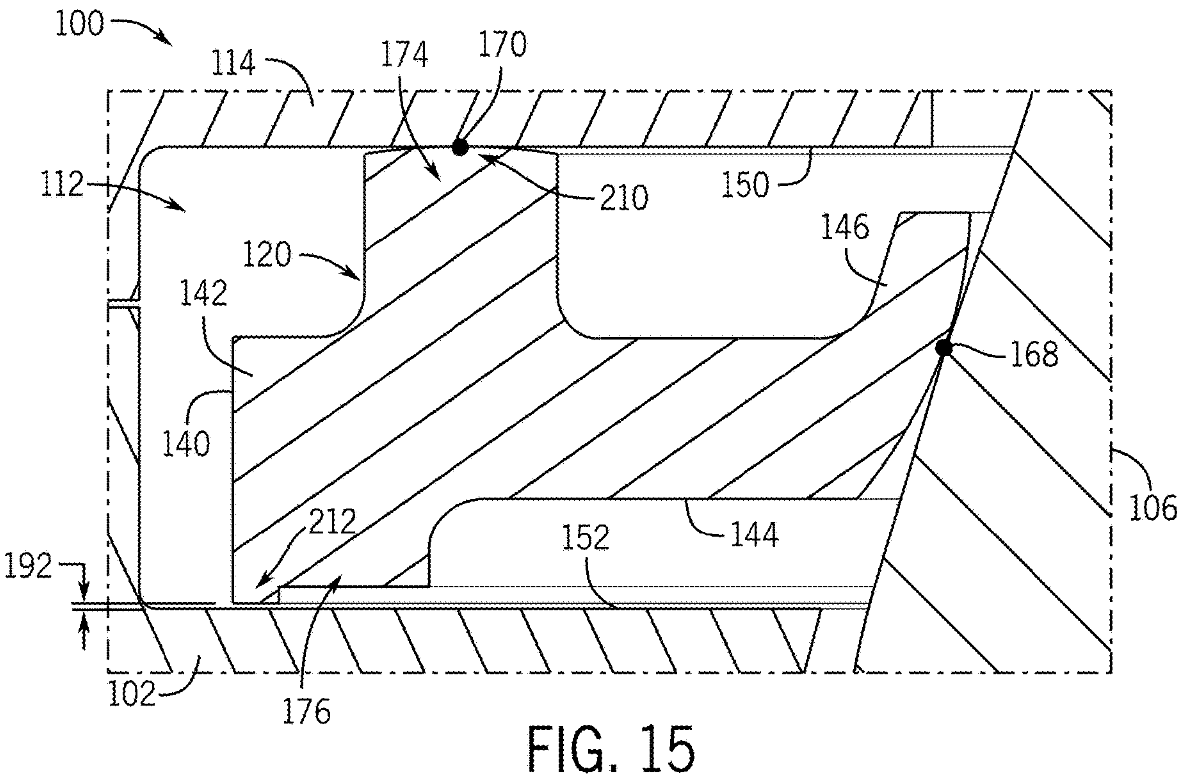
FIG. 15 is a cross-sectional partial view of another embodiment of a seal ring including first and second contact structures, the seal ring seated in a seal cavity of a butterfly valve, according to an example of the disclosed technology.

Other spacing and geometries are also possible in other configurations, including to tune a particular seal as generally described above, In this regard, FIGS. 14 and 15 illustrated example configurations that include greater lateral distance between contact points for the first and second contact structures 210, 212. With reference to FIG. 15 in particular, a relatively square or sharp contact structure 212 is employed, although other configurations can locate a contact point along a rounded surface (as also discussed above).

In general, as indicated above, each of the seal rings 120 of FIGS. 12-23 include first and second contact structures 210, 212 that are laterally offset and each configured to engage a respective wall 150, 152 of the seal ring cavity 112. Furthermore, each of the seal rings 120 of FIGS. 12-23 are configured to form a gap 192 between the upstream portion 176 of the base 142 and the second wall 152 of the seal ring cavity 112 when the seal is not loaded. Additional detail related to FIGS. 14-20 will be omitted to avoid repetition; however, it should be appreciated that similar features, mechanics, and advantages discussed above can be applied to these embodiments of the seal ring 120.

Figure 21:
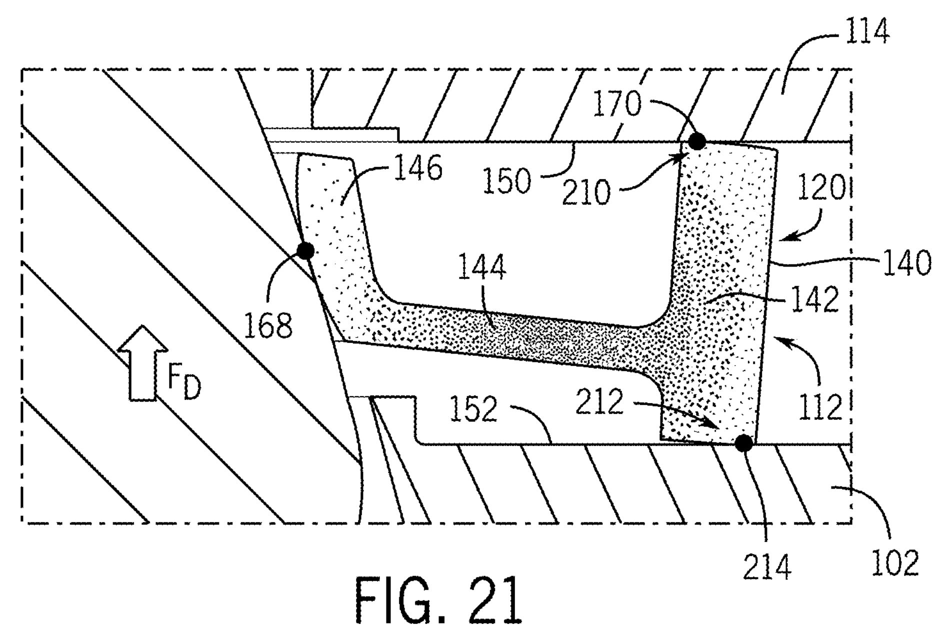
FIG. 21 is an exemplary finite element analysis of a seal ring and a disk of a butterfly valve in a closed position and under relatively high pressure.
Figure 22:
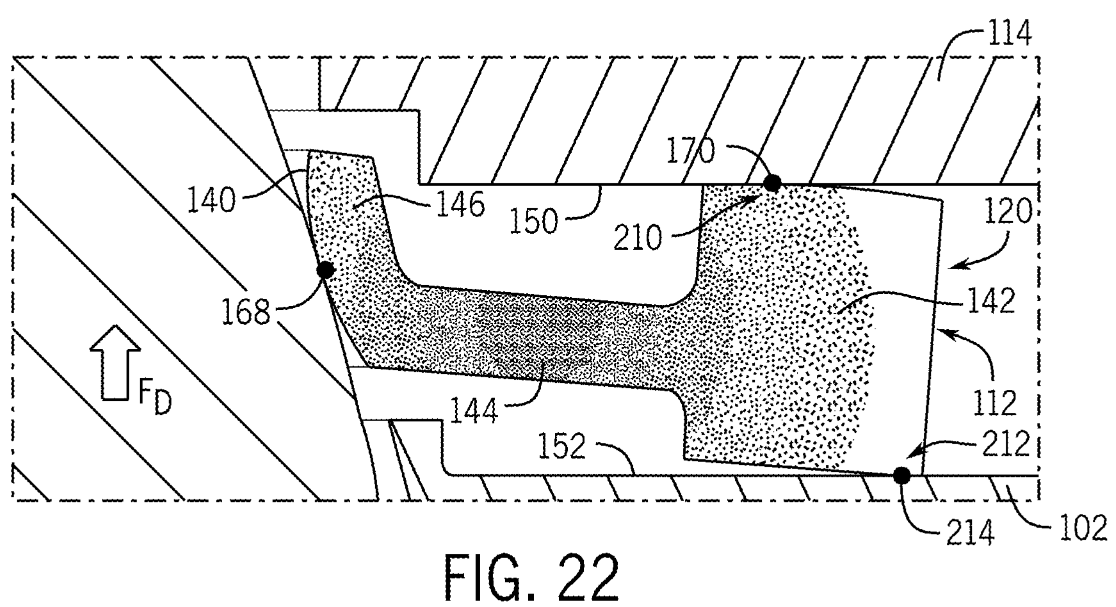
FIG. 22 is another exemplary finite element analysis of a seal ring and a disk of a butterfly valve in a closed position and under relatively high pressure.
Figure 23:
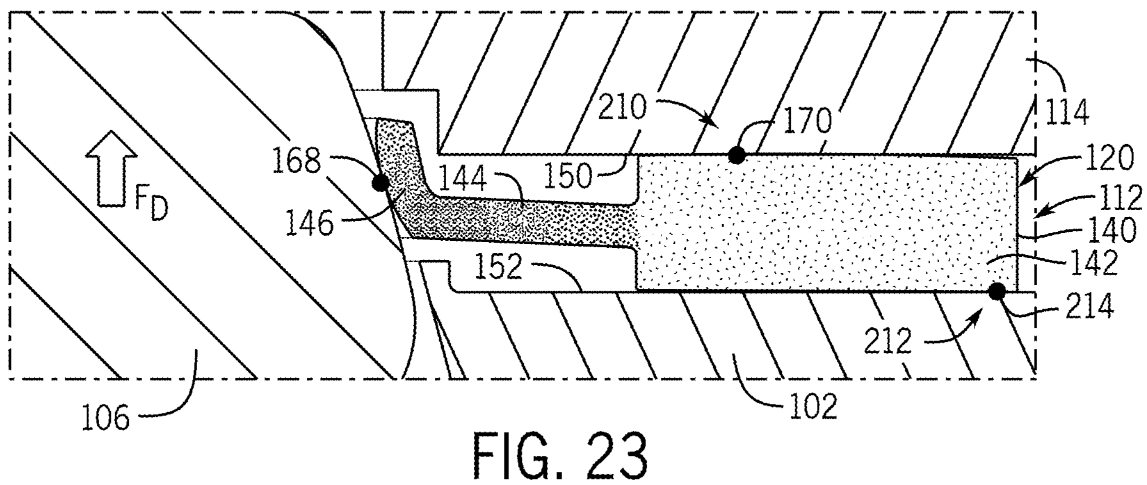
FIG. 23 is another exemplary finite element analysis of a seal ring and a disk of a butterfly valve in a closed position and under relatively high pressure.

FIGS. 21-23 show finite element analyses of additional embodiments of the seal ring 120. As shown in these figures, as the disk 106 acts on the seal ring 120 at the foot 146, a seal is formed between the foot 146 and the disk 106 and between the first contact structure 210. The first and second contact structures 210, 212 acts as pivot points for the base 142 and engage the walls 150, 152 of the seal ring cavity 112 to limit torsion in the seal ring 120. As shown, there are stress concentrations from bending along the leg 144. These concentrations can vary depending on the geometry of the given seal ring 120 but ultimately provide elastic bending without yielding.

FIGS. 24-40 illustrate additional embodiments of seal rings 120. For example, the seal rings 120 of FIGS. 24-40 include a compression structure 230 at the base 142 of the seal ring body 140 that acts like a spring. In general, the compression structure 230 can provide a retainer load or squeeze feature(s) that reinforces the secondary seal 170, which may be beneficially particularly at lower pressure sealing conditions. The compression structure 230 can provide an initial mechanical loading at the secondary seal 170 which can provide initial seat loads at the disk 106 that facilitate sealing at relatively low pressure (i.e., low fluid pressure against the disk 106). Furthermore, as described above, the offset between the primary seal 168 diameter and the secondary seal 170 diameter provides a pressure assisting area, which increases the secondary seal 170 pressure.

In general, the compression load provided by the compression structure 230 is high enough to promote low pressure sealing, but is low enough to ensure the seal ring 120 can track the disk 106 in the lateral direction. That is, the seal ring 120 can still move within the seal ring cavity 112 in the lateral direction (i.e., perpendicular to a pipeline axis) in the event of misalignment of the seal ring 120 and disk 106 centerlines. Thus, the embodiments of the seal ring 120 shown in FIGS. 24-40 provide similar advantageous disk tracking as described above with reference to earlier figures.

Figures 24, 25:
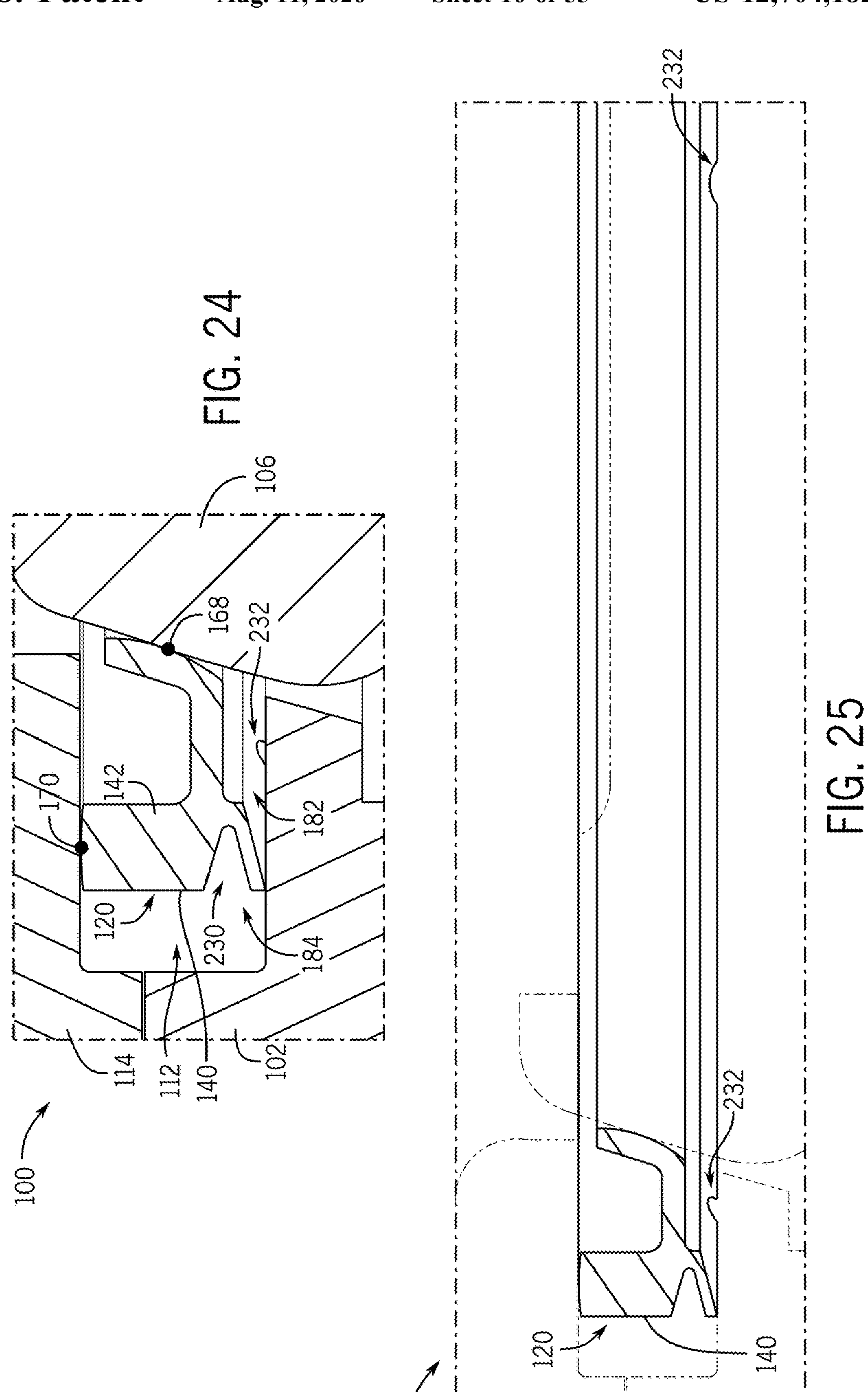
FIG. 24 is a cross-sectional partial view of an embodiment of a seal ring including a compression structure, the seal ring seated in a seal cavity of a butterfly valve, according to an example of the disclosed technology.
FIG. 25 is a cross-sectional partial view of the seal ring of FIG. 24 showing a pressure balance passageway of the seal ring.

Furthermore, the exemplary seal rings 120 shown in FIGS. 24-40 can include one or more pressure balance passageways 232 (see, for example, FIGS. 24 and 25). A pressure balance passageway 232 can be configured as one or more scallops that can allow upstream pressure and pressure in the upstream volume 182 (e.g., $P_1$ in FIG. 8) to migrate past the compression structure 230 to the outward lateral volume 184. In general, a pressure balance passageway 232 can prevent pressure from being trapped behind the seal ring 120 and can facilitate pressure assisting seals.

Some embodiments of the compression structure 230 of the seal rings 120 can include one or more compression legs. The compression legs generally refer to a cross-sectional feature, which is axisymmetric in its behavior. For example, the compression structure 230 of FIGS. 24-29 include a single compression leg feature. A single leg compression (e.g., bending) feature produces interference between the seal ring 120, the seal retainer 114, and the valve body 102 within the seal ring cavity 112. The single compression leg feature of the compression structure 230 can either be formed at an external diameter of the base 142 (see FIGS. 24-28 and 30-35) or formed or disposed at an internal diameter of the base 142 (see FIGS. 29 and 36).

In some embodiments, a sealing system according to embodiments of the disclosure can include the seal ring 120 with the seal ring body 140 integrally formed as a single unitary body. In other embodiments, the sealing system can include additional components that are not unitarily formed with the seal ring body 140 (see FIG. 36).

With reference to FIGS. 24 and 25, the compression structure 230 can be a cutout (e.g., a machined notch or other recess) in the outer diameter of the base 142. For example, the compression structure 230 of FIGS. 24 and 25 is approximately a 35° notch (e.g., similar to a turning insert). The V-profile of the compression structure shown in FIGS. 24 and 25 facilitates elastic bending and provides a spring constant and secondary seat load on the seal retainer 114. Various machining methods can be used to produce this compression structure 230, such as insert plugging, grooving tools, or profiling. Similar to FIGS. 12-23, some of the seal rings 120 of FIGS. 24-40 can include first and second contact structures 210, 212 that are offset in the axial direction. This can provide similar advantages as discussed above with reference to FIGS. 12-23.

Figure 26:
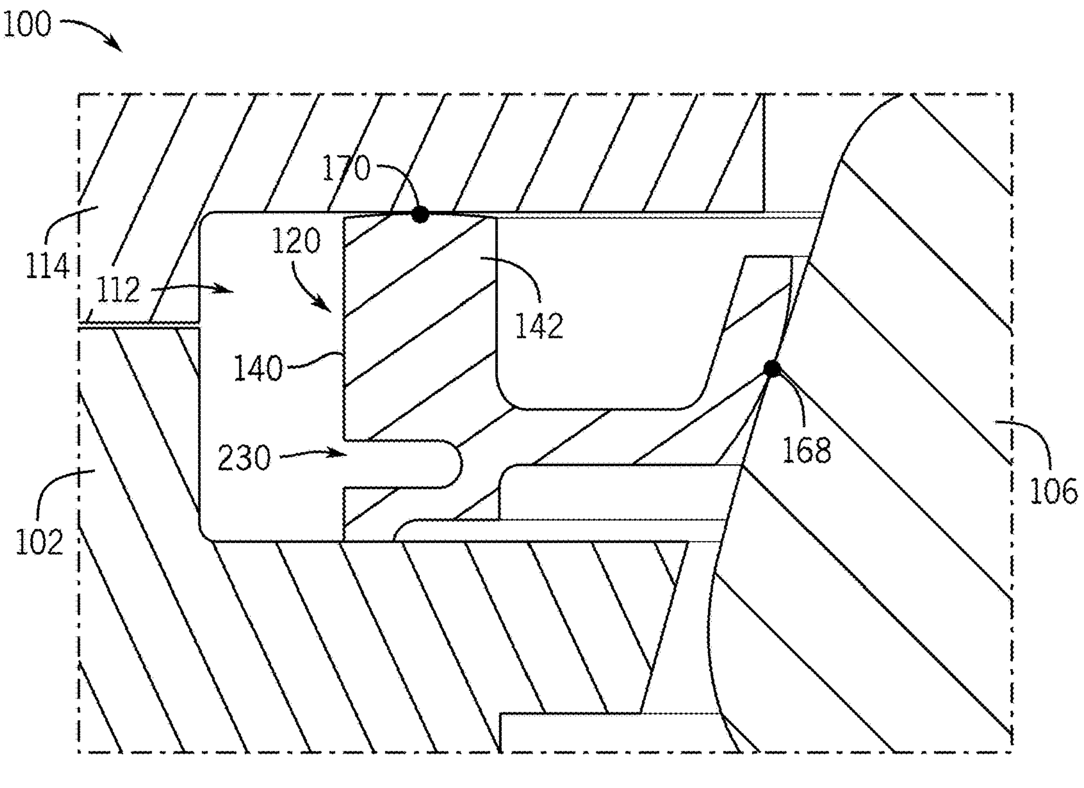
FIG. 26 is a cross-sectional partial view of another embodiment of a seal ring including a compression structure, the seal ring seated in a seal cavity of a butterfly valve, according to an example of the disclosed technology.
Figure 27:
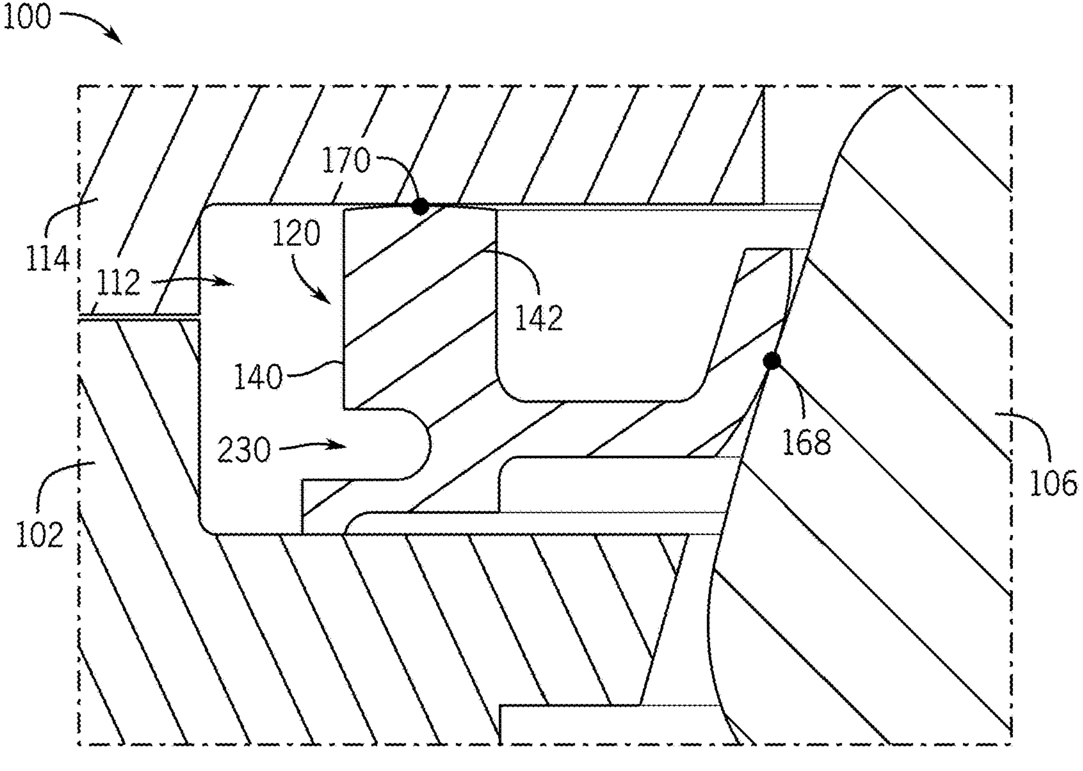
FIG. 27 is a cross-sectional partial view of another embodiment of a seal ring including a compression structure, the seal ring seated in a seal cavity of a butterfly valve, according to an example of the disclosed technology.
Figures 28, 29:
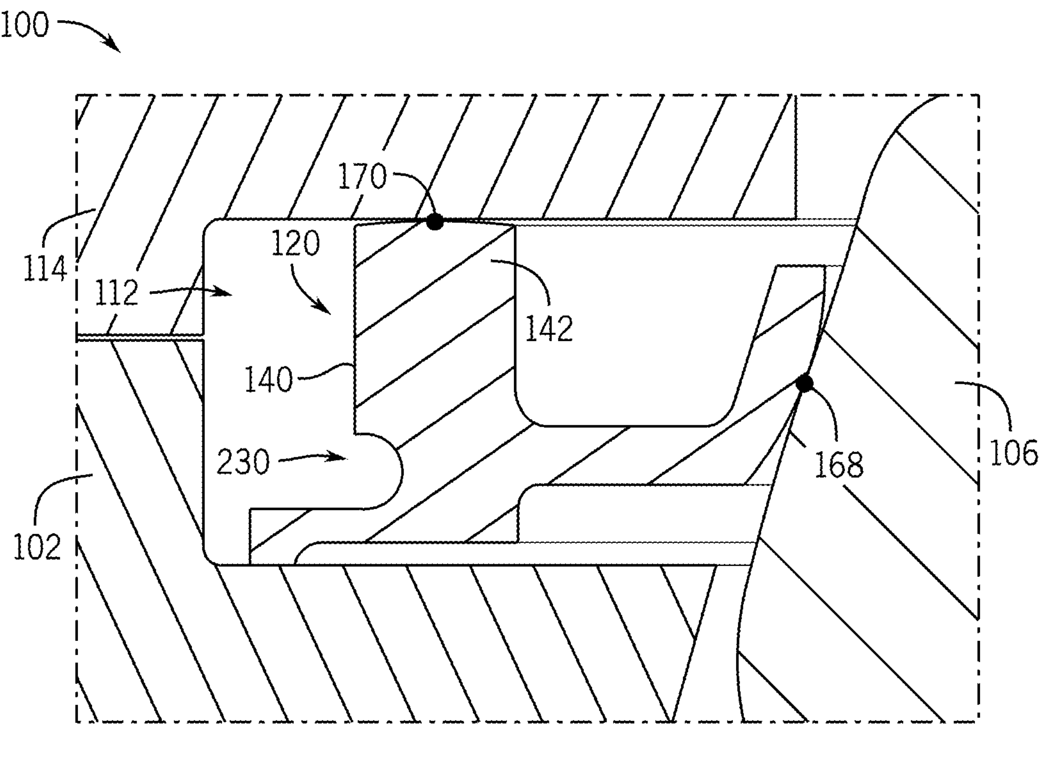
FIG. 28 is a cross-sectional partial view of another embodiment of a seal ring including a compression structure, the seal ring seated in a seal cavity of a butterfly valve, according to an example of the disclosed technology.
FIG. 29 is a cross-sectional partial view of another embodiment of a seal ring including a compression structure, the seal ring seated in a seal cavity of a butterfly valve, according to an example of the disclosed technology.
Figure 30:
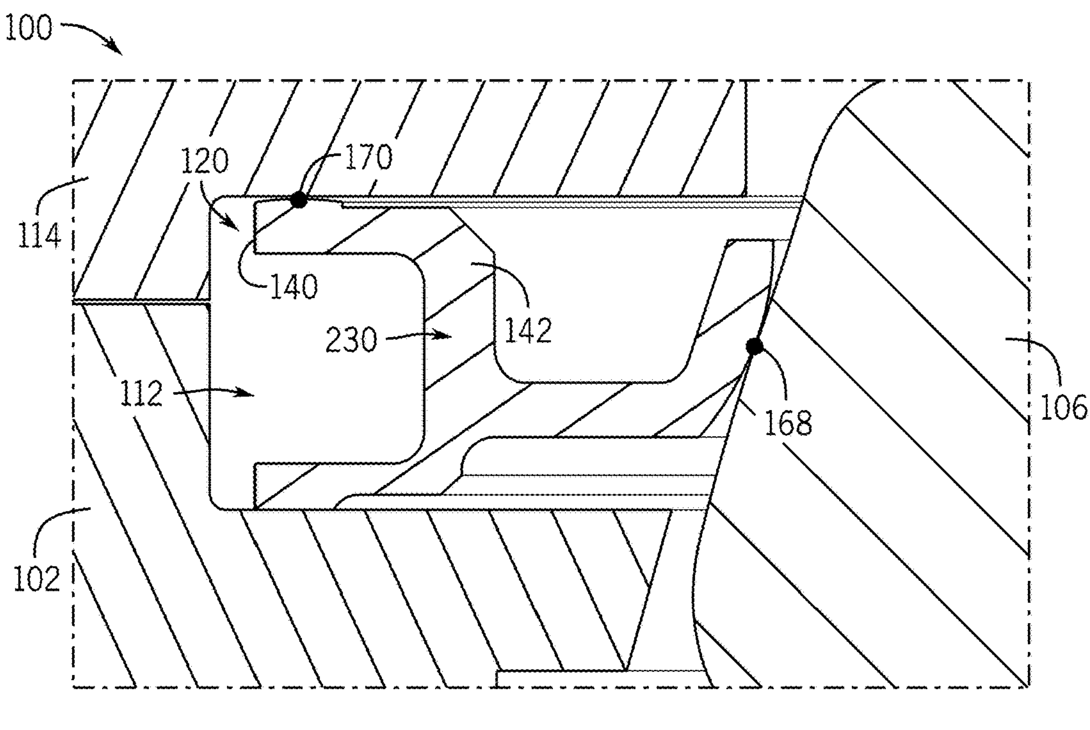
FIG. 30 is a cross-sectional partial view of another embodiment of a seal ring including a compression structure, the seal ring seated in a seal cavity of a butterfly valve, according to an example of the disclosed technology.
Figure 31:
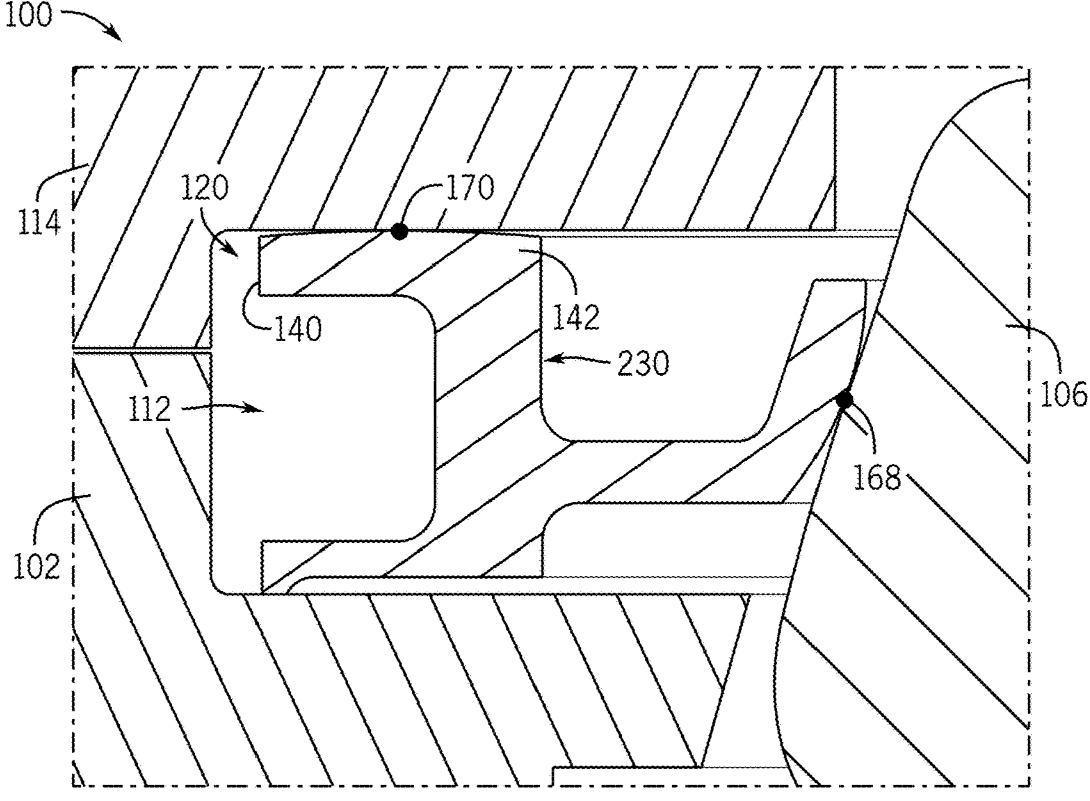
FIG. 31 is a cross-sectional partial view of another embodiment of a seal ring including a compression structure, the seal ring seated in a seal cavity of a butterfly valve, according to an example of the disclosed technology.
Figures 32, 33:
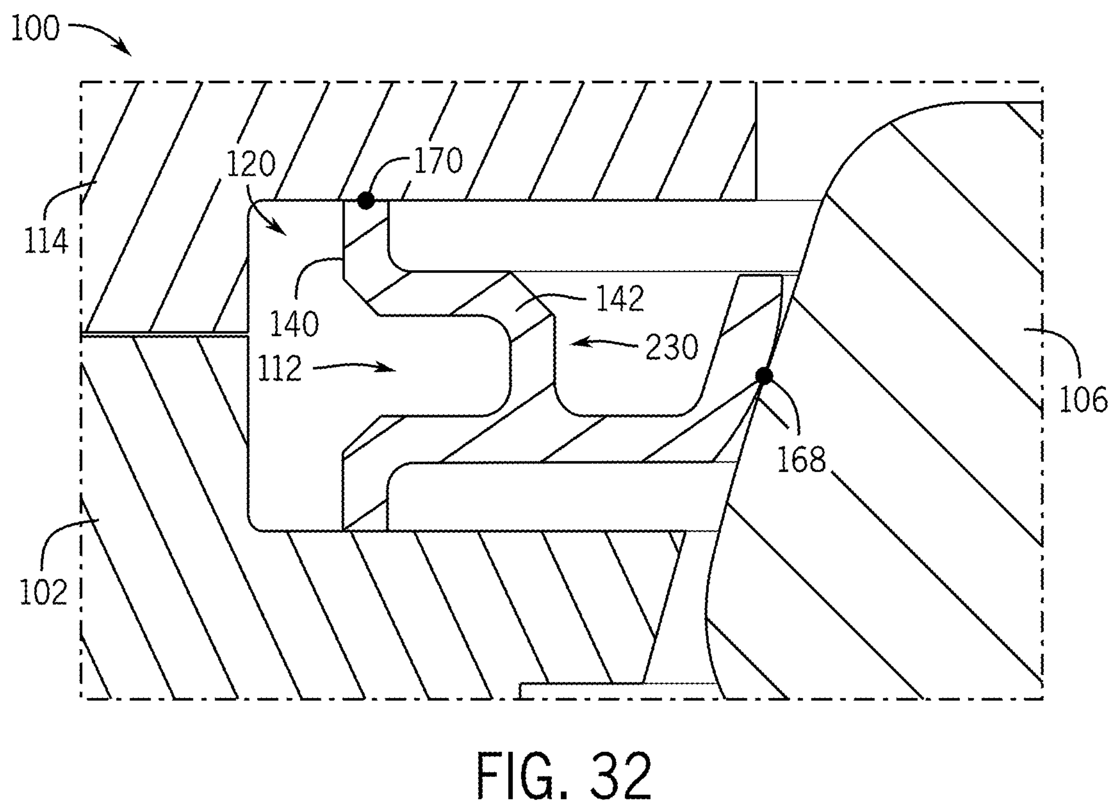
FIG. 32 is a cross-sectional partial view of another embodiment of a seal ring including a compression structure, the seal ring seated in a seal cavity of a butterfly valve, according to an example of the disclosed technology.
FIG. 33 is a cross-sectional partial view of another embodiment of a seal ring including a compression structure, the seal ring seated in a seal cavity of a butterfly valve, according to an example of the disclosed technology.
Figure 34:
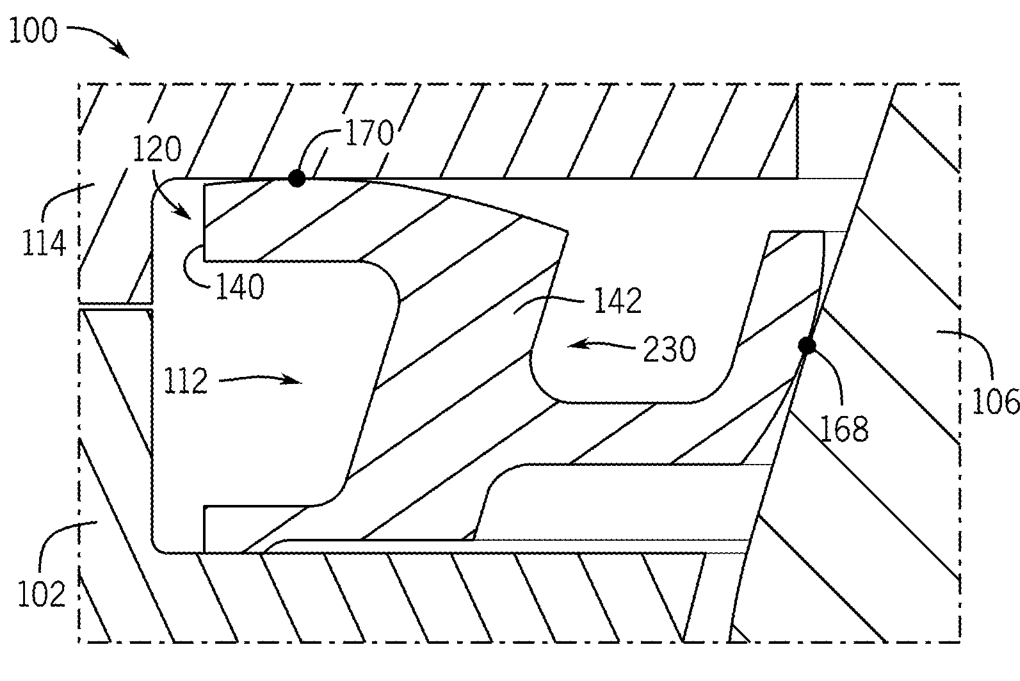
FIG. 34 is a cross-sectional partial view of another embodiment of a seal ring including a compression structure, the seal ring seated in a seal cavity of a butterfly valve, according to an example of the disclosed technology.
Figure 35:
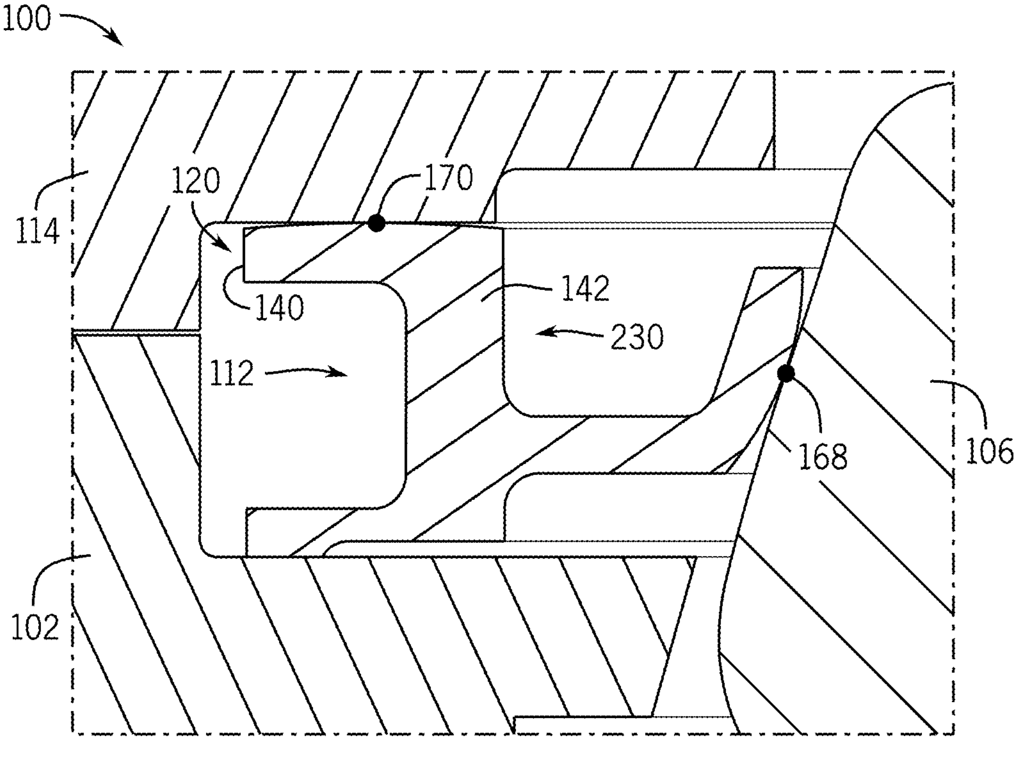
FIG. 35 is a cross-sectional partial view of another embodiment of a seal ring including a compression structure, the seal ring seated in a seal cavity of a butterfly valve, according to an example of the disclosed technology.

FIGS. 26-29 also show the compression structure 230 as a single compression leg feature. FIGS. 26-28 generally show the single compression leg feature being formed by a groove or slot that extends perpendicularly into the outer diameter of the seal ring 120 (e.g., in the lateral direction with respect to the figures) and FIG. 29 includes a groove or slot that extends perpendicularly into the inner diameter of the base 142.

FIGS. 30-35 show embodiments of the compression structure 230 configured as a dual leg compression feature. The dual leg compression feature generally forms a C-shaped cross section that provides a dual reaction load within the seal ring cavity 112. The seal retainer 114 side of the compression structure 230 can incorporate a partial torus feature so that when the primary seal 168 is engaged with the disk 106 (e.g., during disk drift), the seal torsion allows the secondary seal 170 to rock and maintain contact with the seal retainer 114. As shown in FIGS. 30-35, the dual leg compression features can have a variety of geometries, but each generally allow the compression of the dual legs to occur at the same diameter so that a retainer squeeze is produced, and not an artificial rocking of the seal. In general, elastic bending is meant to occur on the leg of the compression structure 230 closest to the valve body 102 within the seal ring cavity 112; however the other leg (i.e., the leg closest to the seal retainer 114) may bend to elastically provide load (e.g., as a result of a thinner configuration of an upstream leg, as generally shown in FIGS. 27-29).

In general, when the diameter of the contact between the seal ring 120 and the seal retainer 114 (i.e., at the secondary seal 170) is different than the diameter of contact between seal ring 120 and the valve body 102 (i.e., at the tertiary contact point 214), a cross-sectional moment is created when the seal retainer 114 is compressed (e.g., fully seated) by pipe flange forces. This elastic cross-sectional torsion of the seal ring 120 is produced by installation, and can be an aid to initial primary seating loads, or subtract from them, according to design requirements and usage expectations.

Figure 36:
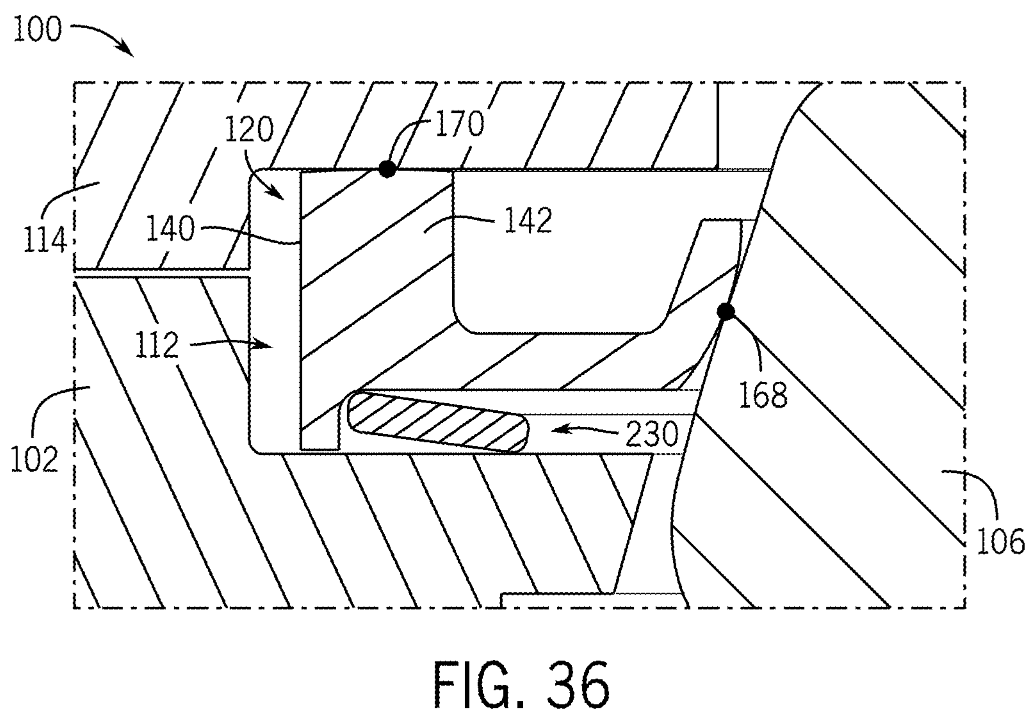
FIG. 36 is a cross-sectional partial view of another embodiment of a seal ring including a compression structure, the seal ring seated in a seal cavity of a butterfly valve, according to an example of the disclosed technology.

With reference to FIG. 36, the compression structure 230 of the ring can optionally be in the form of a secondary spring. The secondary spring may be separate from the seal ring body 140. The secondary spring can be one or more of a variety of springs or other elastic bodies as generally known in the art. In some embodiments, the secondary spring can be combined with one or more compression structures 230 of the seal ring 120. In the illustrated embodiment of FIG. 36, the compression structure 230 configured as the secondary spring is disposed between the base 142 and the valve body 102 in the seal ring cavity 112 to load the seal ring 120 against the seal retainer 114.

Figure 37:
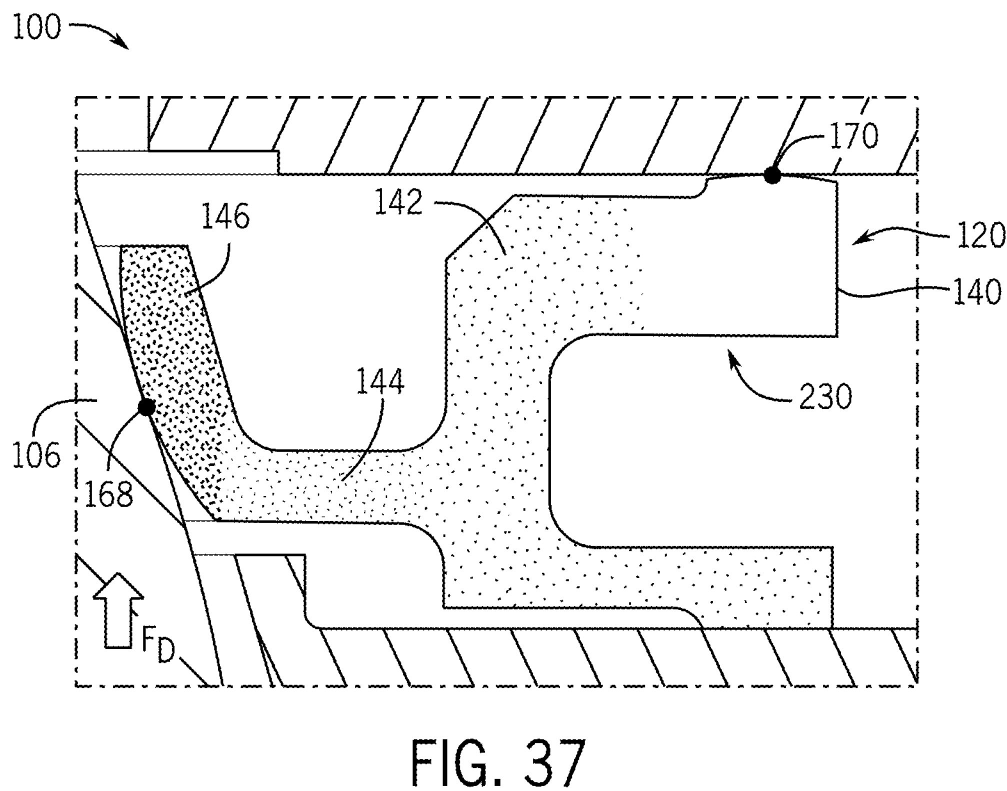
FIG. 37 is an exemplary finite element analysis of a seal ring and a disk of a butterfly valve in a closed position and under relatively low pressure.
Figure 38:
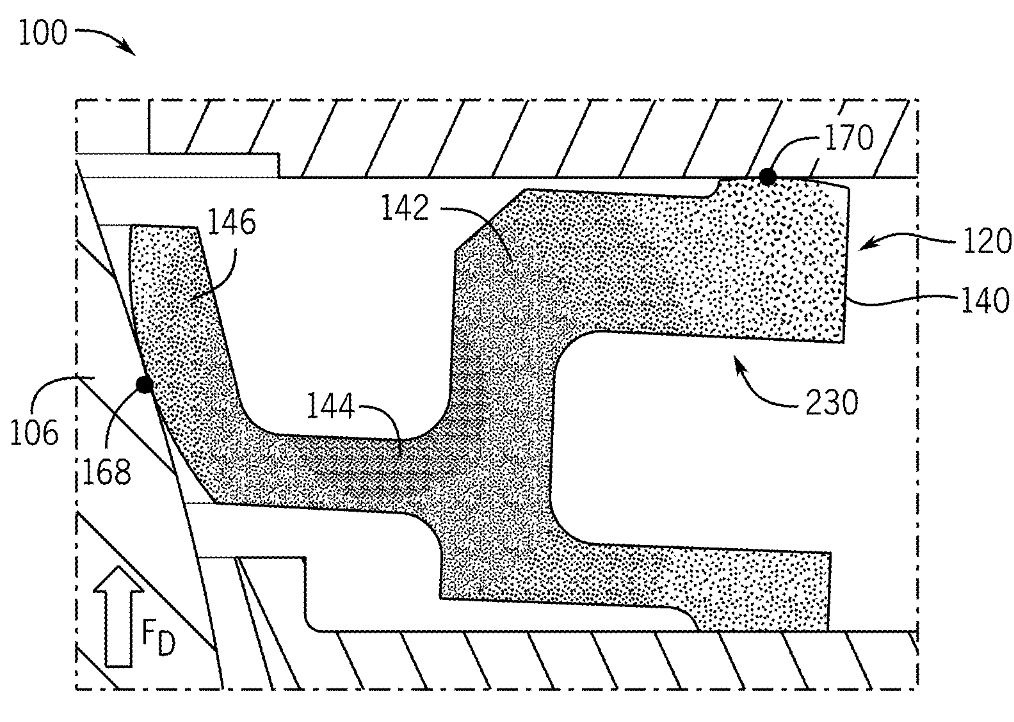
FIG. 38 is an exemplary finite element analysis of the seal ring of FIG. 37 and the disk of the butterfly valve in a closed position and under relatively high pressure.
Figure 39:
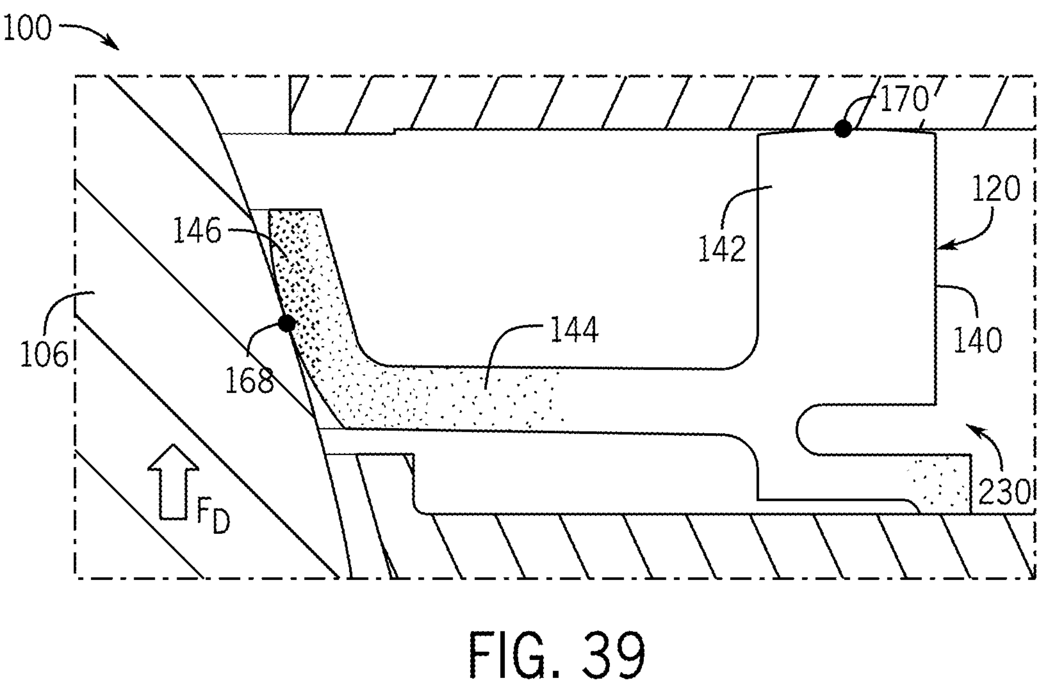
FIG. 39 is an exemplary finite element analysis of a seal ring and a disk of a butterfly valve in a closed position and under relatively low pressure.
Figure 40:
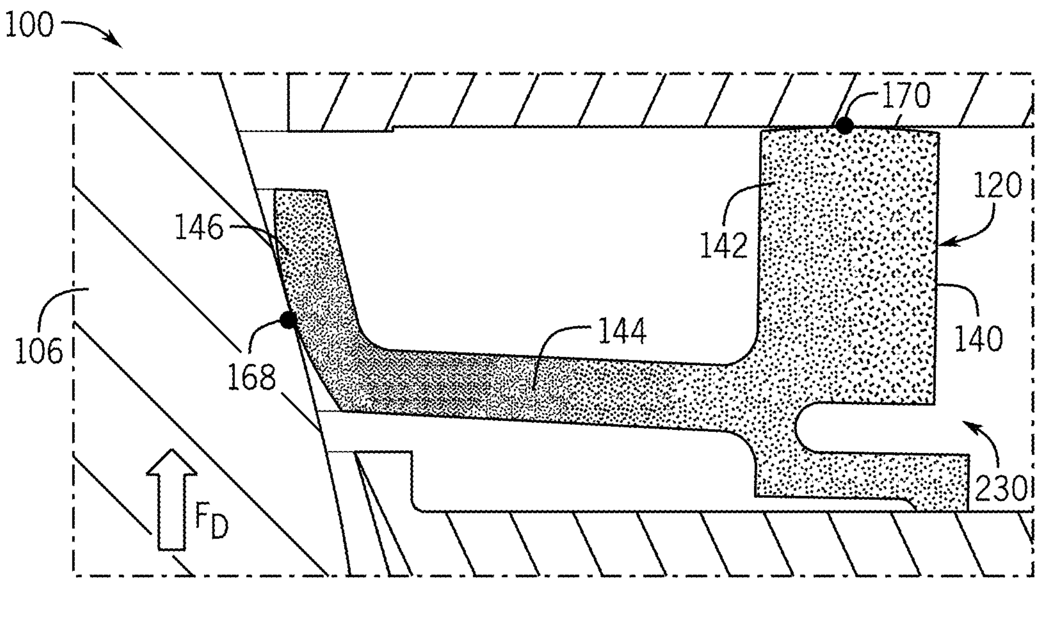
FIG. 40 is an exemplary finite element analysis of the seal ring of FIG. 39 and the disk of the butterfly valve in a closed position and under relatively high pressure.

FIGS. 37-40 show finite element analyses of embodiments of the seal ring 120. FIGS. 37 and 38 show exemplary analyses conducted under high and low pressures, respectively, acting on the disk 106. As shown in FIG. 37, there is minimal stress acting on the seal ring body 140 at low pressure drops. In contrast, FIG. 38 shows stress concentrating along different areas of the seal ring body 140 at high pressure drops, including at the leg 144. The bending that occurs at the leg 144 is elastic and the geometry will return to the original shape once pressure is decreased on the disk 106. FIGS. 39 and 40 show similar stress concentrations to FIGS. 37 and 38, respectively.

FIGS. 41-52 illustrate additional embodiments of seal rings 120. For example, the seal rings 120 of FIGS. 41-52 include a seal member 240 that is not unitarily formed with the seal ring body 140 (e.g., that is received as an insert into a body of the base 142 of the seal ring 120). In general, the geometries of the seal rings 120 are similar to the geometry of the seal ring 120 described in FIGS. 6-11 and have the same or similar advantages to those described above. One difference between the seal rings 120 of FIGS. 41-52 and the seal ring 120 of FIGS. 6-11 is the incorporation of the seal member 240 at the secondary seal 170. As shown in FIGS. 41-52, the seal member 240 can be disposed between the base 142 of the seal ring 120 and the seal retainer 114 within the seal ring cavity 112. In general, the seal member 240 can provide auxiliary sealing at the secondary seal 170.

Figure 41:
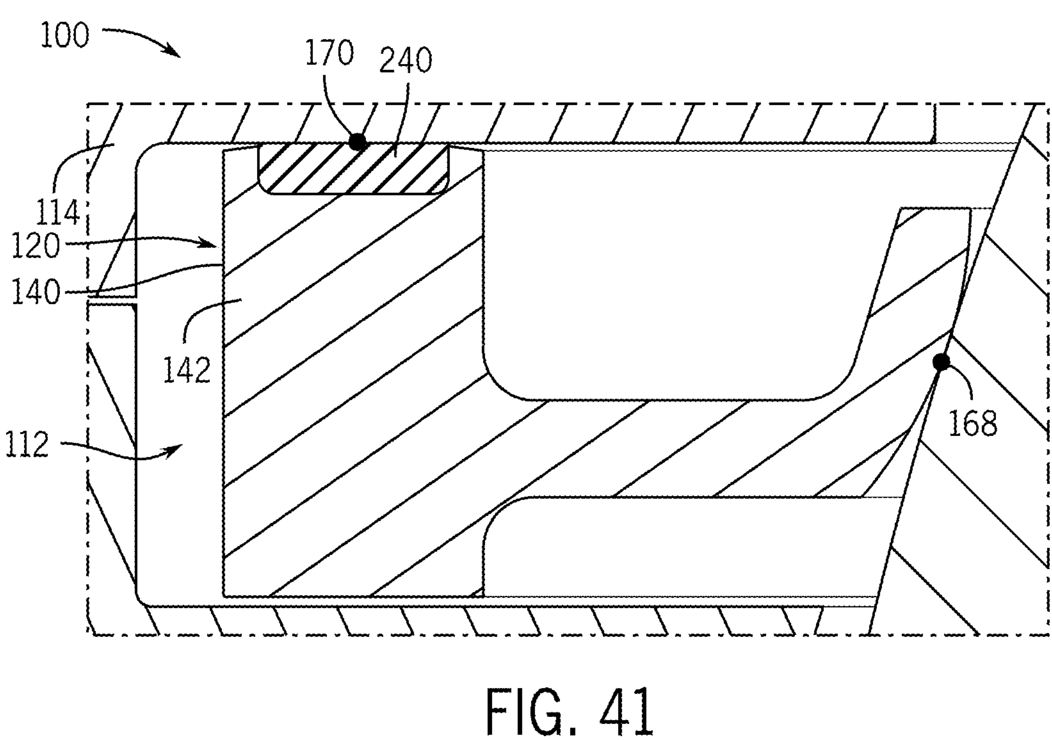
FIG. 41 is a cross-sectional partial view of an embodiment of a seal ring including a secondary seal member, the seal ring seated in a seal cavity of a butterfly valve, according to an example of the disclosed technology.
Figure 42:
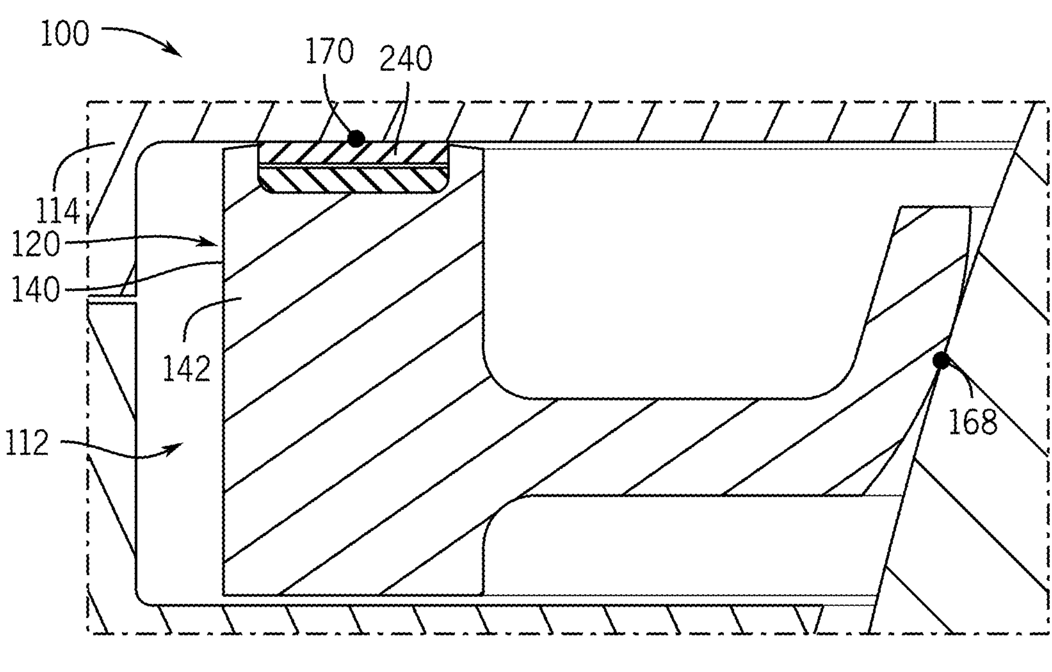
FIG. 42 is a cross-sectional partial view of another embodiment of a seal ring including a secondary seal member, the seal ring seated in a seal cavity of a butterfly valve, according to an example of the disclosed technology.
Figure 43:
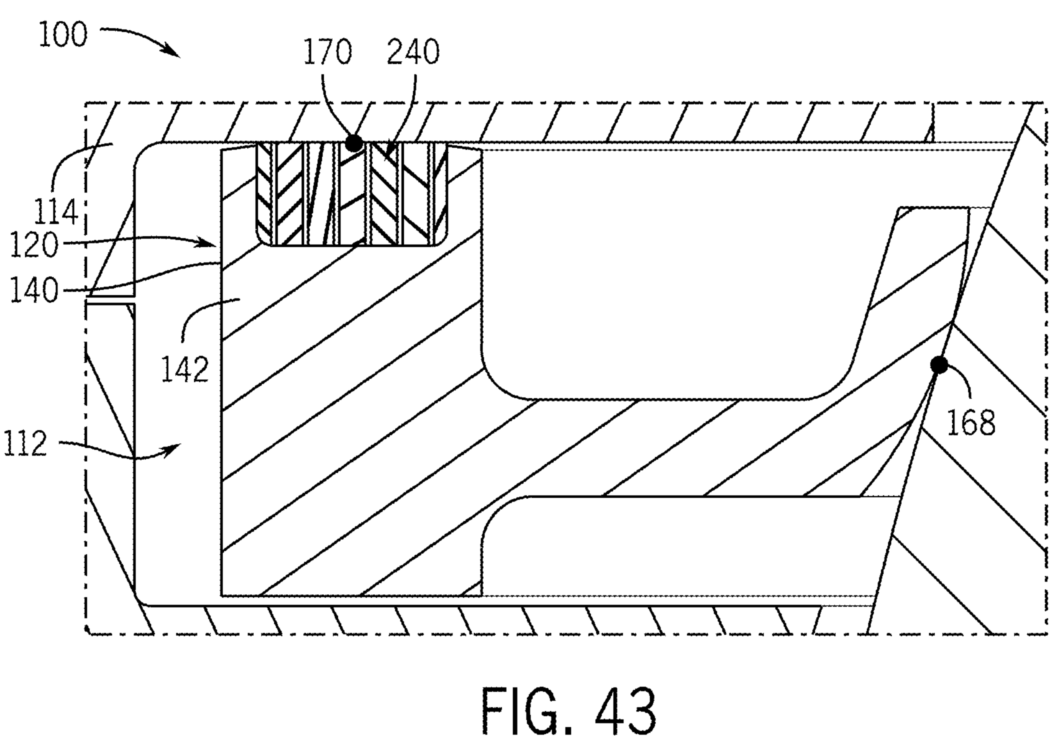
FIG. 43 is a cross-sectional partial view of another embodiment of a seal ring including a secondary seal member, the seal ring seated in a seal cavity of a butterfly valve, according to an example of the disclosed technology.

FIGS. 41-43 show a seal member 240 that can include graphite gasket secondary seal; however, other gasket materials are possible. In FIG. 41, the seal member 240 is a singular seal member. The singular seal member can include a graphite gasket having a full graphite cross section. The seal member 240 can be fixed and loaded via disk drift. In FIG. 42, the seal member 240 includes at least two sub-seal members. The at least two sub-seal members of the seal member 240 can be separated by an intermediate material, such as a metal foil. This intermediate material can increase handleability of the seal member 240, particularly when using graphite sub-seal members. As shown in FIG. 43, the seal member 240 includes a sub-seal radial laminate. The sub-seal radial laminate can include, for example, graphite radial laminate with radial metal rings.

Figure 44:
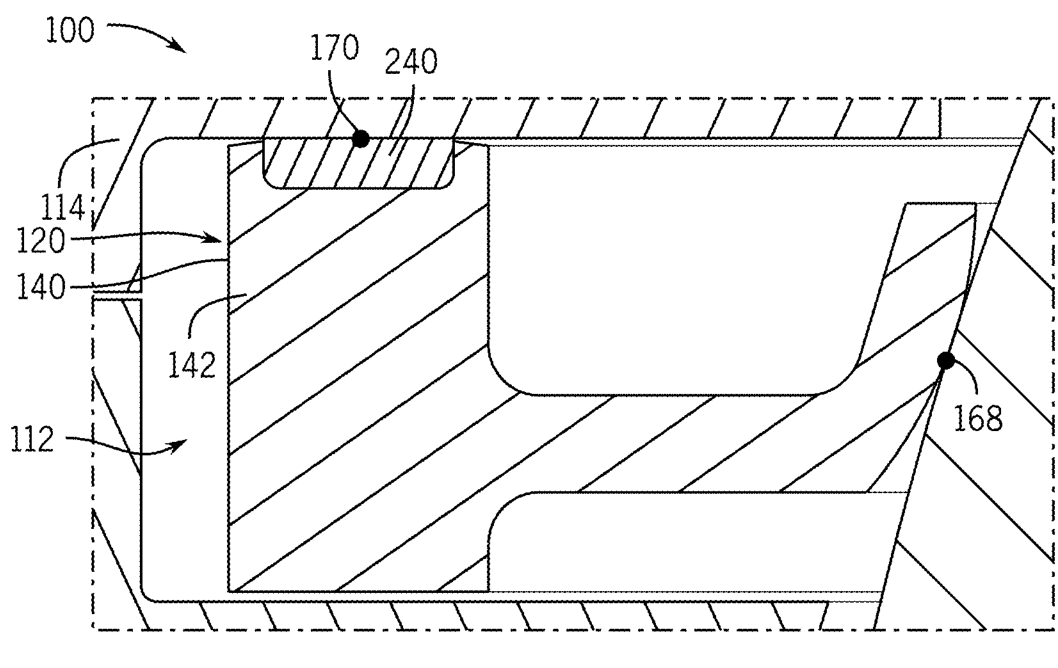
FIG. 44 is a cross-sectional partial view of another embodiment of a seal ring including a secondary seal member, the seal ring seated in a seal cavity of a butterfly valve, according to an example of the disclosed technology.
Figures 45, 46:
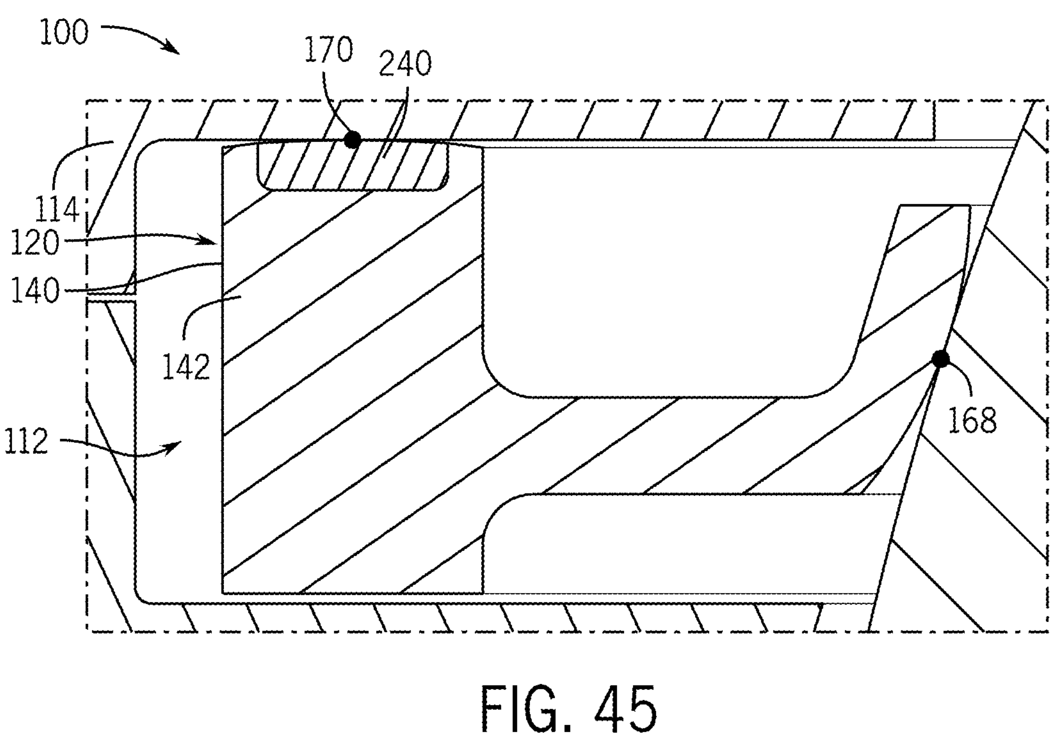
FIG. 45 is a cross-sectional partial view of another embodiment of a seal ring including a secondary seal member, the seal ring seated in a seal cavity of a butterfly valve, according to an example of the disclosed technology.
FIG. 46 is a cross-sectional partial view of another embodiment of a seal ring including a secondary seal member, the seal ring seated in a seal cavity of a butterfly valve, according to an example of the disclosed technology.
Figure 47:
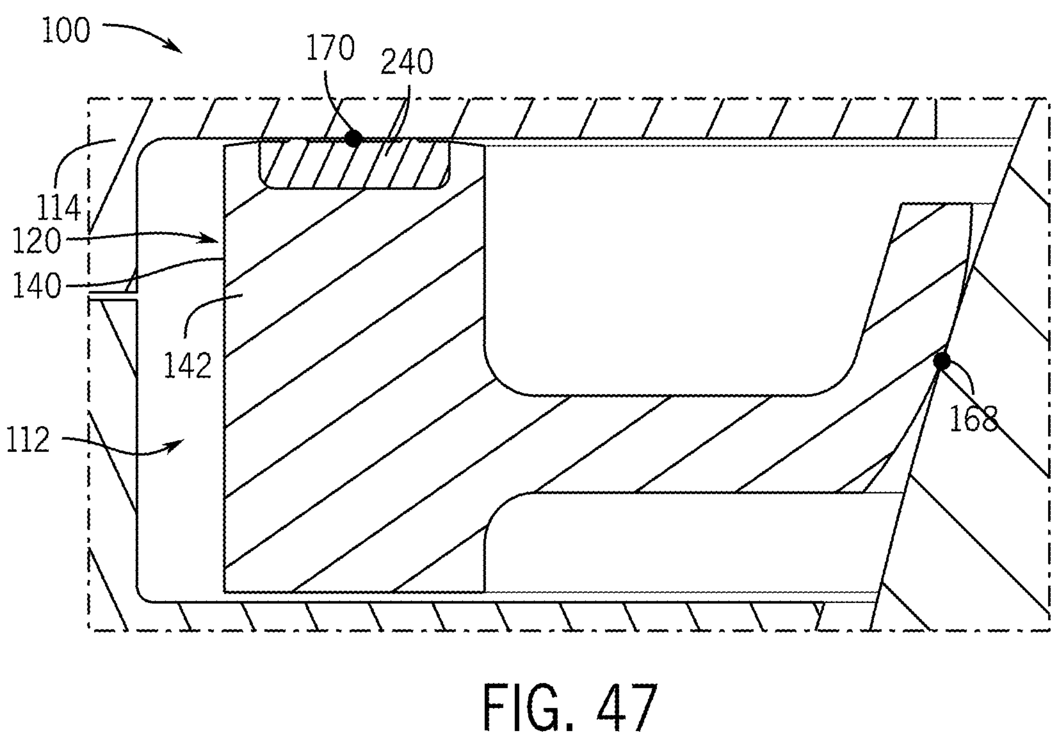
FIG. 47 is a cross-sectional partial view of another embodiment of a seal ring including a secondary seal member, the seal ring seated in a seal cavity of a butterfly valve, according to an example of the disclosed technology.

FIGS. 44-47 show a seal member 240 that can include a polymer gasket secondary seal. In FIG. 44, the seal member 240 is a singular seal member having a generally rectangular cross section that forms a flat face contact with the seal retainer 114. In FIG. 45, the seal member 240 is a singular seal member having a rounded contact with the seal retainer 114. The rounded contact can provide a higher initial contact stress during disk drift compared to a non-rounded contact. In FIG. 46, the seal member 240 is a singular seal member having a beaded contact ridge. Like the rounded or curved contact, the beaded contact ridge can provide a higher initial contact stress compared to a flat contact. FIG. 47 shows the seal member 240 as a singular seal member having multiple beaded contact ridges, and thus, multiple sealing location options.

Figure 48:
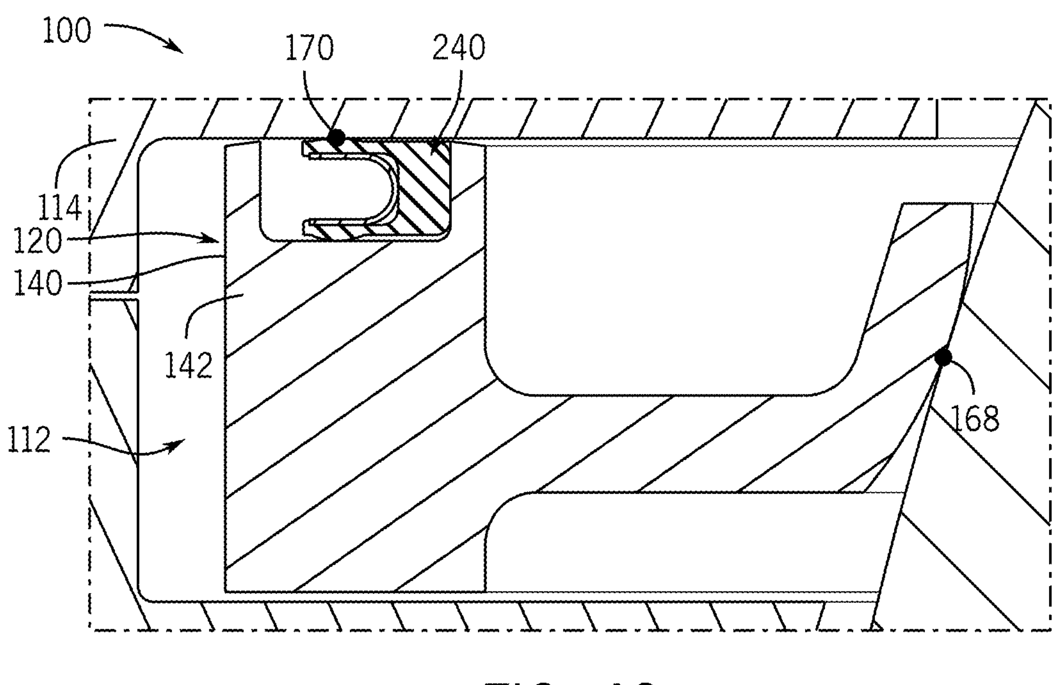
FIG. 48 is a cross-sectional partial view of another embodiment of a seal ring including a secondary seal member, the seal ring seated in a seal cavity of a butterfly valve, according to an example of the disclosed technology.
Figure 49:
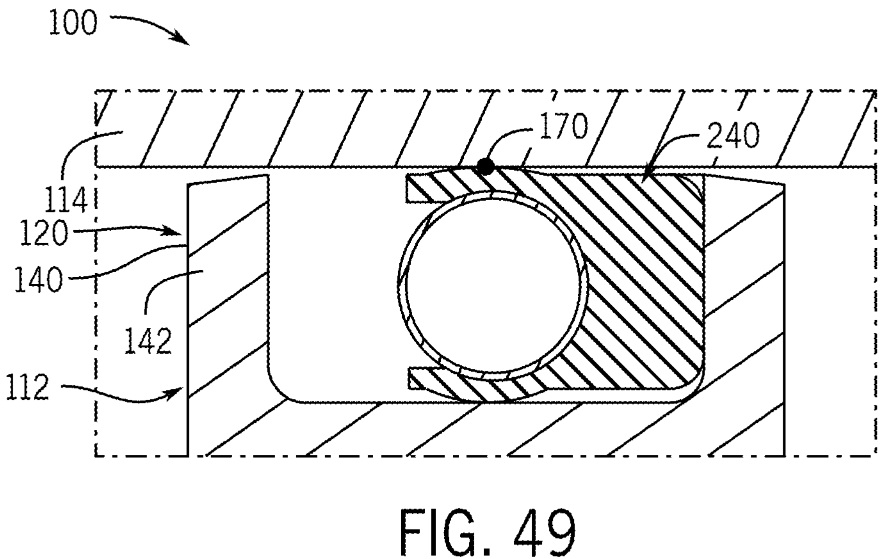
FIG. 49 is a cross-sectional partial view of another embodiment of a seal ring including a secondary seal member, the seal ring seated in a seal cavity of a butterfly valve, according to an example of the disclosed technology.
Figure 50:
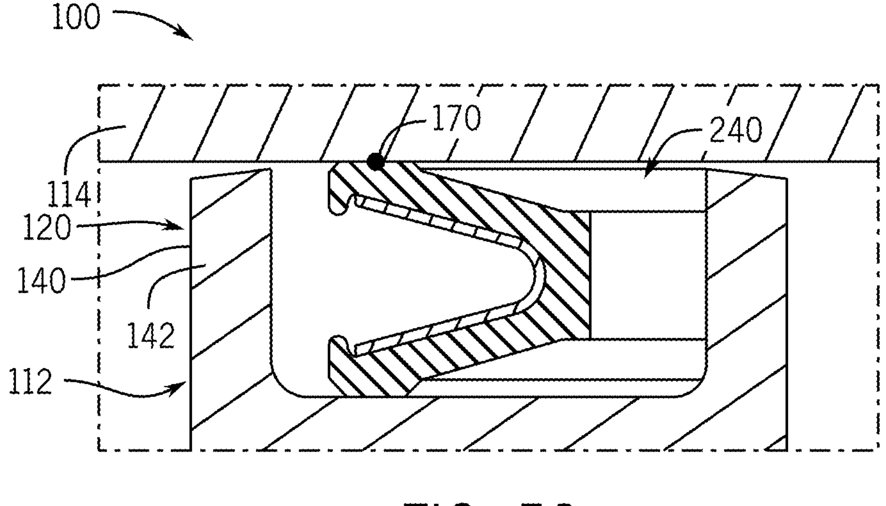
FIG. 50 is a cross-sectional partial view of another embodiment of a seal ring including a secondary seal member, the seal ring seated in a seal cavity of a butterfly valve, according to an example of the disclosed technology.

FIGS. 48-50 show a seal member 240 that can include a spring member. The spring member can include a jacket (e.g., a polymer jacket) that at least partially surrounds an inner spring. The inner spring can provide mechanical low-pressure loading and the jacket can provide an auxiliary seal at the secondary seal 170. Thus, the seal member 240 of FIGS. 48-50 can provide a spring-energized, pressure assisted seal. The geometry of the jacket and inner spring can change depending on a variety of factors, including valve and seal parameters or requirements. As such, FIGS. 48-50 show multiple exemplary embodiments of a seal member 240 configured as spring member.

Figure 51:
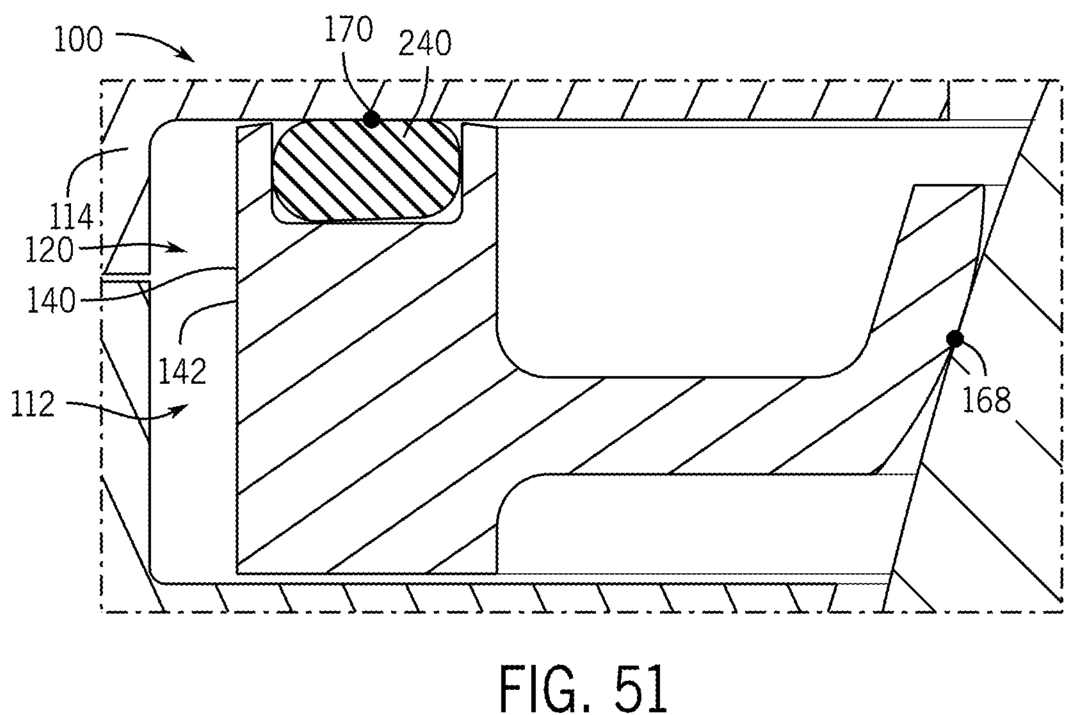
FIG. 51 is a cross-sectional partial view of another embodiment of a seal ring including a secondary seal member, the seal ring seated in a seal cavity of a butterfly valve, according to an example of the disclosed technology.
Figure 52:
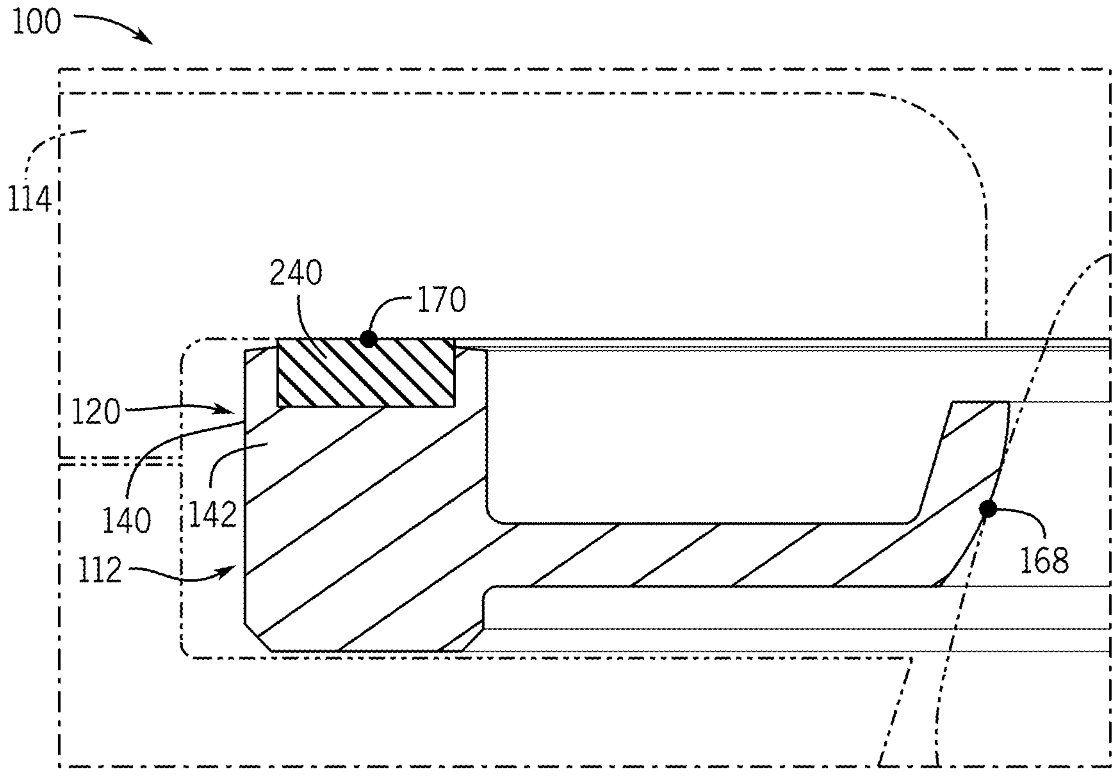
FIG. 52 is a cross-sectional partial view of another embodiment of a seal ring including a secondary seal member, the seal ring seated in a seal cavity of a butterfly valve, according to an example of the disclosed technology.

FIGS. 51 and 52 show a seal member 240 that can include an elastomer O-ring. The elastomer O-ring can have a variety of cross-sectional geometries, including circular (see FIG. 51) or square (see FIG. 52). As noted above, the seal member 240 can provide an auxiliary seal at the secondary seal 170 between the seal ring 120 and the seal retainer 114 within the seal ring cavity.

FIGS. 53-58 illustrate additional embodiments of seal rings 120. For example, the seal rings 120 of FIGS. 53-58 can include a U-shaped or D-shaped cross section. Like the seal rings 120 described above, the seal rings 120 of FIGS. 53-58 can include a seal ring body 140 having a base 142 that contacts a wall 150, 152 of the seal ring cavity 112, a leg 144 that extends in the lateral direction from the base 142, and a foot 146 that extends from the leg 144 and is configured to engage the disk 106 of the valve 100. Also similar to the seal rings 120 described above, the seal rings 120 of FIGS. 53-58 can be allowed to move laterally to accommodate disk tracking.

The seal rings 120 of FIGS. 53-58 can be initially mechanically compressed in the axial direction within the seal ring cavity 112. This retained interference can provide initial loads at the secondary seal 170. However, this initial squeezing load on the seal ring 120 still allows for lateral movement of the seal ring 120 since the seal ring 120 is not permanently fixed or intended to stay laterally stationary within the seal ring cavity 112 like some conventional seal rings.

In general, the seal rings 120 of FIGS. 53-58 are similar to the seal rings 120 described above in that they provide elastic behavior (e.g., as a reaction to disk drift) and experience cross-sectional torsion under load. Notably, the seal ring 120 of FIGS. 53 and 54 include an upper base 142 that rotates laterally outward under disk pressure and the seal rings 120 of FIGS. 55 and 56 include an upper base 142 that rotates laterally inwardly toward the disk with an increased elastic range compared to FIGS. 53 and 54.

The seal rings 120 of FIGS. 53-58 can also include one or more pressure balance passageways 232, similar to the pressure balance passageways 232 described above with reference to FIGS. 24 and 25. The pressure balance passageways 232 can allow upstream pressure to migrate past the compression structure (e.g., the seal ring 120) to prevent pressure from being trapped behind the pressure ring (e.g., at the outward lateral volume 184).

Figure 53:
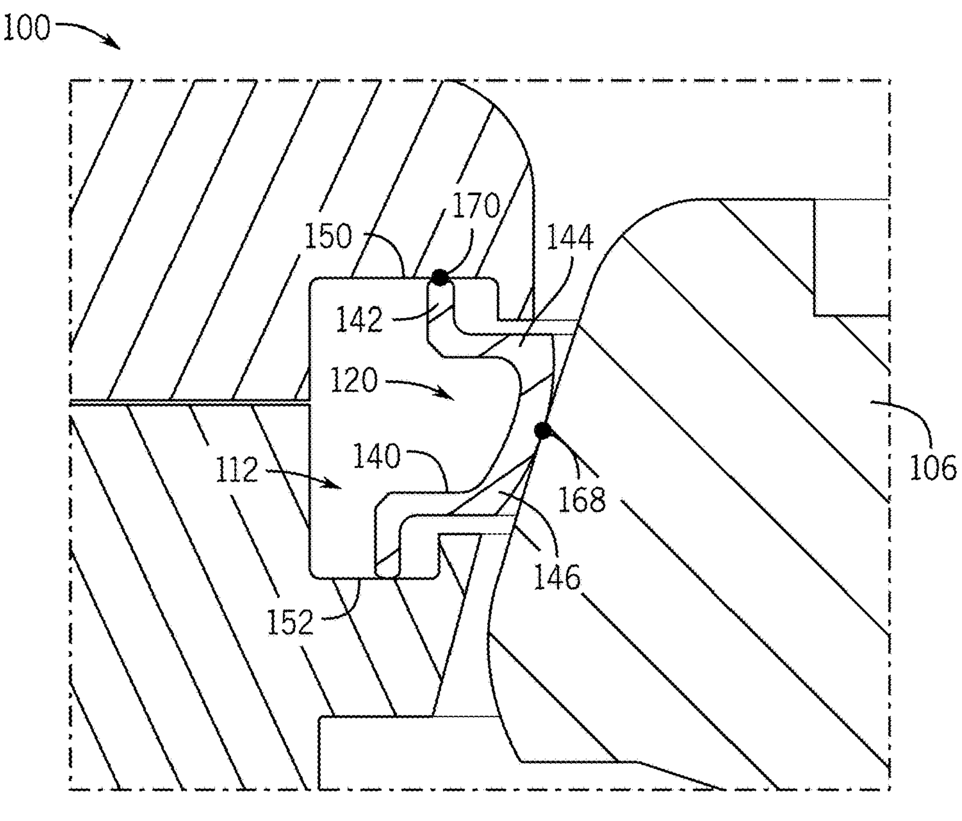
FIG. 53 is a cross-sectional partial view of an embodiment of a secondary seal ring, the seal ring seated in a seal cavity of a butterfly valve, according to an example of the disclosed technology.
Figure 54:
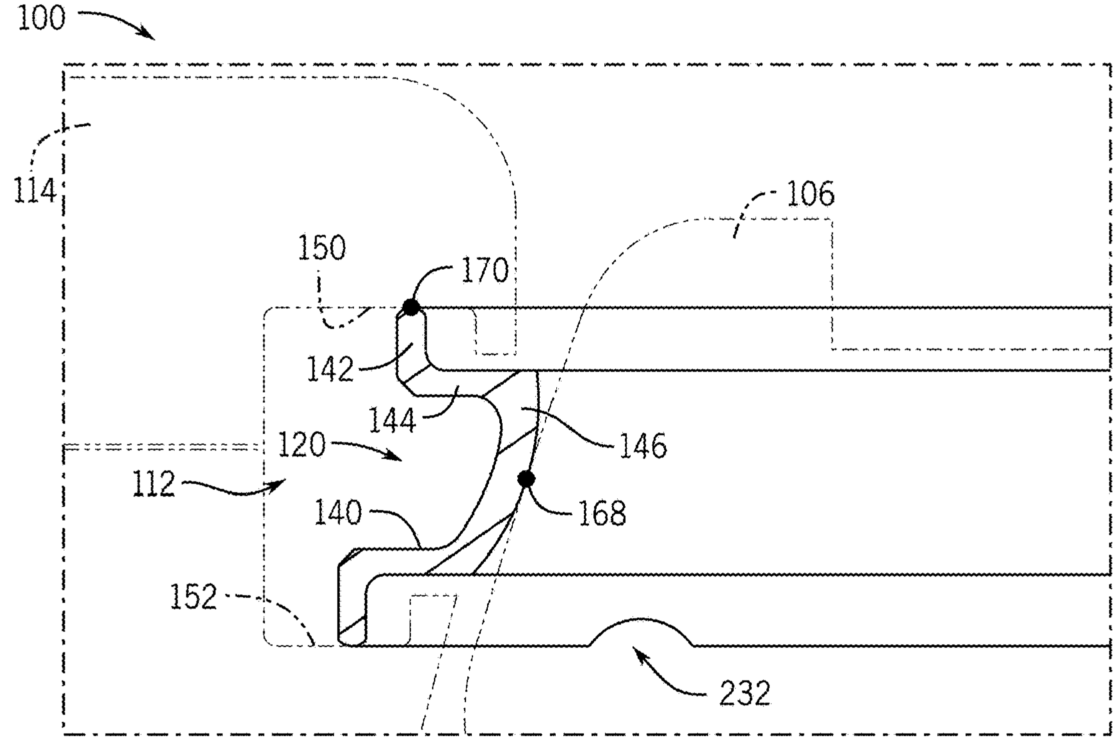
FIG. 54 is a cross-sectional partial view of the seal ring of FIG. 53 showing a pressure balance passageway of the seal ring.
Figures 55, 56:
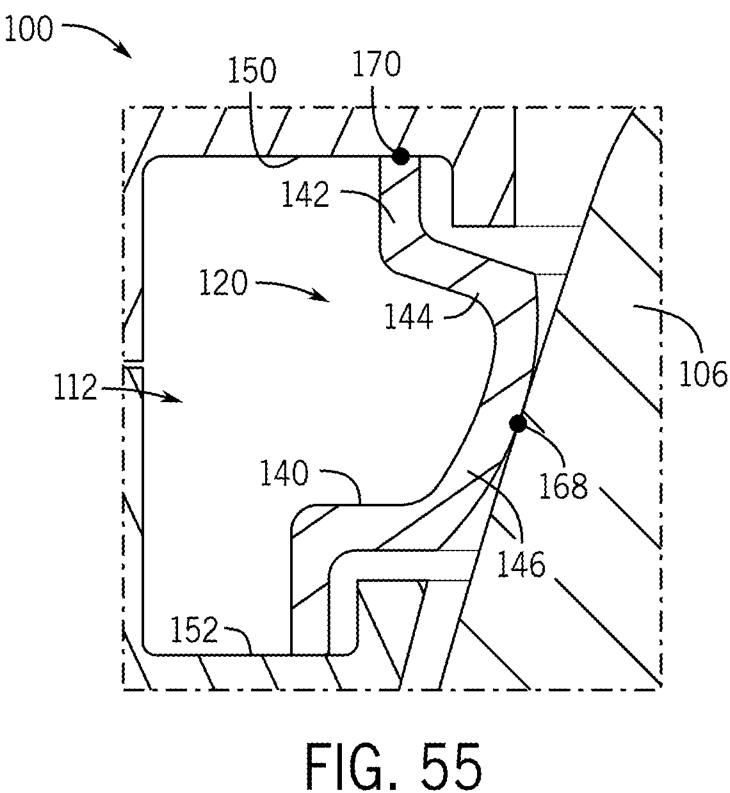
FIG. 55 is a cross-sectional partial view of another embodiment of a secondary seal ring, the seal ring seated in a seal cavity of a butterfly valve, according to an example of the disclosed technology.
FIG. 56 is a cross-sectional partial view of another embodiment of a secondary seal ring, the seal ring seated in a seal cavity of a butterfly valve, according to an example of the disclosed technology.
Figure 57:
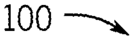
FIG. 57 is an exemplary finite element analysis of the seal ring of FIG. 56 and the disk of the butterfly valve in a closed position and under relatively low pressure.
Figure 57:
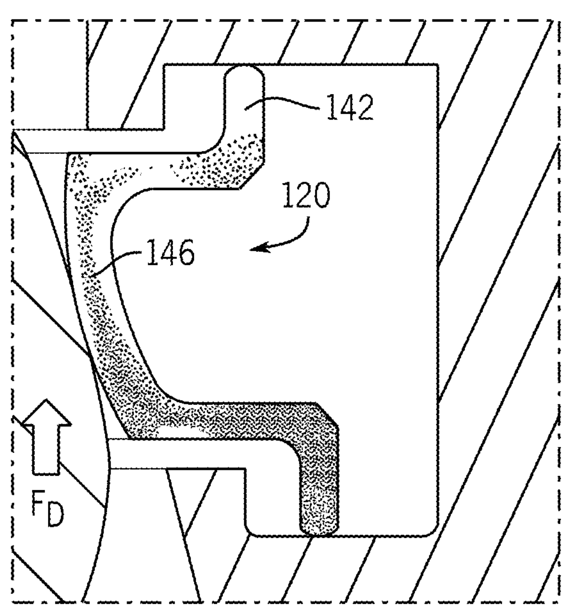
Figure 58:
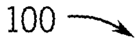
FIG. 58 is an exemplary finite element analysis of the seal ring of FIG. 56 and the disk of the butterfly valve in a closed position and under relatively high pressure.
Figure 58:
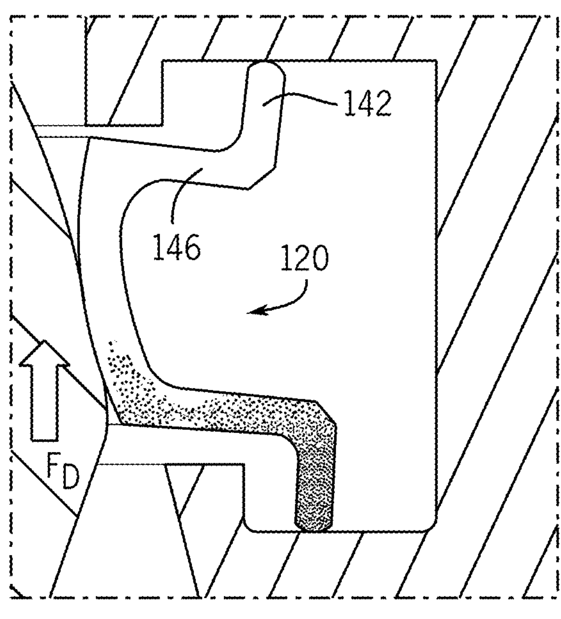

FIGS. 57 and 58 show finite element analyses of the seal ring 120 of FIGS. 53 and 54. FIG. 57 shows stress concentrations within the seal ring 120 at relatively low pressures and FIG. 58 shows stress concentrations within the seal ring 120 at relatively high pressures. Overall, any bending that occurs in the foot 146, leg 144, or base 142 is elastic and the geometry will return to the original shape once pressure is decreased on the disk 106.

As noted above, the figures within this disclosure are by way of examples, and features described herein or others may be used to produce the same or similar advantageous bending and torsion of a seal ring within a valve. Thus, examples of the disclosed technology can provide an improvement over conventional systems and methods for sealing control valves. The previous description of the disclosed examples is provided to enable any person skilled in the art to make or use the disclosed technology. Various modifications to these examples will be readily apparent to those skilled in the art, and the generic principles defined herein may be applied to other examples without departing from the spirit or scope of the disclosed technology. Thus, the disclosed technology is not intended to be limited to the examples shown herein but is to be accorded the widest scope consistent with the principles and novel features disclosed herein Unless otherwise specified or limited, the terms "about" and "approximately," as used herein with respect to a reference value, refer to variations from the reference value of ±15% or less, inclusive of the endpoints of the range. Similarly, the term "substantially," as used herein with respect to a reference value, refers to variations from the reference value of ±5% or less, inclusive of the endpoints of the range.

Also as used herein with respect to clamped systems, unless otherwise specified or limited, "axial" is used to refer to a main flow direction past a valve seat of a valve and "radial" is used to refer to directions that are perpendicular to the main flow direction.

Also as used herein, unless otherwise limited or defined, "or" indicates a non-exclusive list of components or operations that can be present in any variety of combinations, rather than an exclusive list of components that can be present only as alternatives to each other. For example, a list of "A, B, or C" indicates options of: A; B; C; A and B; A and C; B and C; and A, B, and C. Correspondingly, the term "or" as used herein is intended to indicate exclusive alternatives only when preceded by terms of exclusivity, such as "either," "one of," "only one of," or "exactly one of." For example, a list of "one of A, B, or C" indicates options of: A, but not B and C; B, but not A and C; and C, but not A and B. A list preceded by "one or more" (and variations thereon) and including "or" to separate listed elements indicates options of one or more of any or all of the listed elements. For example, the phrases "one or more of A, B, or C" and "at least one of A, B, or C" indicate options of: one or more A; one or more B; one or more C; one or more A and one or more B; one or more B and one or more C; one or more A and one or more C; and one or more of A, one or more of B, and one or more of C. Similarly, a list preceded by "a plurality of" (and variations thereon) and including "or" to separate listed elements indicates options of multiple instances of any or all of the listed elements. For example, the phrases "a plurality of A, B, or C" and "two or more of A, B, or C" indicate options of: A and B; B and C; A and C; and A, B, and C.

Also as used herein, unless otherwise limited or defined, "integral" and derivatives thereof (e.g., "integrally") describe elements that are manufactured as a single piece without fasteners, adhesive, or the like to secure separate components together. For example, an element that is stamped, cast, or otherwise molded as a single-piece component from a single piece of sheet metal or other continuous single piece of material, without rivets, screws, other fasteners, or adhesive to hold separately formed pieces together, is an integral (and integrally formed) element. In contrast, an element formed from multiple pieces that are separately formed initially then later fastened together, is not an integral (or integrally formed) element.

In some implementations, devices or systems disclosed herein can be utilized, manufactured, installed, etc. using methods embodying aspects of the disclosed technology. Correspondingly, any description herein of particular features, capabilities, or intended purposes of a device or system is generally intended to include disclosure of a method of using such devices for the intended purposes, of a method of otherwise implementing such capabilities, of a method of manufacturing relevant components of such a device or system (or the device or system as a whole), and of a method of installing disclosed (or otherwise known) components to support such purposes or capabilities. Similarly, unless otherwise indicated or limited, discussion herein of any method of manufacturing or using for a particular device or system, including installing the device or system, is intended to inherently include disclosure, as examples of the disclosed technology, of the utilized features and implemented capabilities of such device or system.

Also as used herein, unless otherwise defined or limited, directional terms are used for convenience of reference for discussion of particular figures or examples or to indicate spatial relationships relative to particular other components or context, but are not intended to indicate absolute orientation. For example, references to downward, forward, or other directions, or to top, rear, or other positions (or features) may be used to discuss aspects of a particular example or figure, but do not necessarily require similar orientation or geometry in all installations or configurations.

Also as used herein, unless otherwise limited or defined, "configured to" indicates that a component, system, or module is particularly adapted for the associated functionality. Thus, for example, a ZZ configured to YY is specifically adapted to YY, as opposed to merely being generally capable of doing so.

Although the presently disclosed technology has been described with reference to preferred examples, workers skilled in the art will recognize that changes may be made in form and detail to the disclosed examples without departing from the spirit and scope of the concepts discussed herein.

The invention claimed is:

1. A valve assembly, comprising:
- a valve body;
- a valve passageway extending in an axial direction through the valve body;
- a disk arranged to selectively inhibit flow through the valve passageway of the valve body, the disk being movable between a valve open position and a valve closed position;
- a seal cavity formed at least partly in the valve body; and
- a seal ring including:
- a base extending continuously in the axial direction within the seal cavity to provide an upstream contact structure and a downstream contact structure, relative to flow through the valve passageway along the axial direction;
- a leg extending from the base transversely to the axial direction, from a location axially between the upstream and downstream contact structures; and
- a foot extending transversely from a distal end of the leg, at least partly in the axial direction,
- with the disk in the valve closed position and loaded with a first pressure from the upstream direction, a primary seal being formed between the foot of the seal ring and the disk and a secondary seal being formed between an axially oriented portion of the downstream contact structure and a downstream wall of the seal cavity.

2. The valve assembly of claim 1, wherein boundaries of the seal cavity are formed by the valve body and a seal retainer, and
- wherein the secondary seal is formed between the seal retainer and the downstream contact structure of the base of the seal ring.

3. The valve assembly of claim 1, wherein in response to disk drift when the disk is in the valve closed position and loaded with a second pressure from the upstream direction that is larger than the first pressure:
- the leg is configured to deflect relative to the base, including rotation about a first rotation point, and
- the base is configured to be loaded in torsion by the leg to rotate about a second rotation point spaced apart from the first rotation point.

4. The valve assembly of claim 3, wherein, at the first pressure, a gap is formed in the axial direction between the upstream contact structure of the base of the seal ring and an upstream wall of the seal cavity.

5. The valve assembly of claim 4, wherein, at the second pressure, rotation of the base causes the upstream contact structure to contact the upstream wall of the seal cavity to form a tertiary seal; and
- wherein the secondary seal is radially offset from the tertiary seal.

6. The valve assembly of claim 1, wherein the seal ring further includes a compression structure that is in biasing contact with an upstream wall of the seal cavity to urge the downstream contact structure toward the downstream wall.

7. The valve assembly of claim 6, wherein the compression structure is a spring disposed between an upstream side of the base of the seal ring and the upstream wall of the seal cavity.

8. The valve assembly of claim 6, wherein the compression structure is formed by a notch in the base and includes the upstream contact structure.

9. A seal system for a butterfly valve that includes a disk and a seal ring cavity, the seal system comprising:
- a seal ring having a seal ring body, the seal ring body comprising:
- a base that extends continuously in an axial direction between an upstream end and a downstream end and is configured to be received within the seal ring cavity;
- a leg that extends inwardly from the base in a radial direction, to extend toward a disk of the butterfly valve from within the seal ring cavity, the leg being cantilevered relative to the base, in a cross-sectional plane that extends along the axial direction and the radial direction of the seal ring; and a foot extending from the leg in a downstream direction, opposite the base, to engage the disk of the butterfly valve to provide a primary seal when the disk is in a closed position, an axially oriented portion of the downstream end of the base being configured to provide a secondary seal at a downstream wall of the seal ring cavity; and the leg being flexibly supported relative to the base to permit rotation of the base upon axial loading of an upstream side of the leg, to provide a tertiary seal between the upstream end of the base and an upstream wall of the seal ring cavity.

10. The seal system of claim 9, wherein the seal ring body is an integrally formed unitary metal body.

11. The seal system of claim 9, wherein the downstream end of the base includes a downstream contact structure configured to provide the secondary seal; and wherein the upstream end of the base includes an upstream contact structure configured to provide the tertiary seal, in response to torsion loading of the base by the axial loading of the leg.

12. The seal system of claim 11, wherein the upstream contact structure is oriented to provide the tertiary seal at a radially offset location from the secondary seal.

13. The seal system of claim 9, wherein the seal ring body includes a passageway that fluidically couples an upstream side of the seal ring body with an outer radial side of the seal ring body.

14. A method of sealing a butterfly valve, the method comprising:

rotating a disk of a butterfly valve toward a closed position so that the disk engages a foot of a seal ring, the seal ring having a base that extends continuously in an axial direction between an upstream end and a downstream end within a seal cavity of the butterfly valve, and a leg extending from the base, the foot extending from the leg opposite the base in a downstream direction relative to flow past the disk, applying a first upstream pressure to the disk, relative to a flow direction through the butterfly valve, so that:

the leg deflects in the downstream direction to form a primary seal between the foot and the disk; and the base is loaded by the deflection of the leg to engage a downstream wall of the seal cavity with the downstream end to form a secondary seal between an axially oriented portion of the base and the seal cavity.

15. The method of claim 14, wherein the seal ring is moveable in a radial direction to accommodate disk misalignment, the radial direction being perpendicular to the flow direction through the butterfly valve.

16. The method of claim 14, further comprising:

applying a second upstream pressure to the disk that is larger than the first upstream pressure, to cause the disk to drift in a downstream direction;

wherein the disk drift causes rotation of the base to engage an upstream wall of the seal cavity to form a tertiary seal between the base and the seal cavity.

17. The method of claim 16, wherein during application of the first upstream pressure, a gap is formed between the base of the seal ring at an upstream side of the seal ring and a second wall of the seal cavity; and wherein the rotation of the base closes the gap to form the tertiary seal.

* * * * *